US012771874B2

(12) United States Patent
McCready et al.

(10) Patent No.: US 12,771,874 B2
(45) Date of Patent: Oct. 20, 2026

(54) METHOD AND SYSTEM FOR ENCODING A 3D SCENE

(71) Applicant: Active Theory Inc, Covina, CA (US)

(72) Inventors: Joshua McCready, Truckee, CA (US); Alexander Gourley, Grass Valley, CA (US)

(73) Assignee: ACTIVE THEORY INC, Covina, CA (US)

( * ) Notice: Subject to any disclaimer, the term of this patent is extended or adjusted under 35 U.S.C. 154(b) by 1 day.

(21) Appl. No.: 18/900,169

(22) Filed: Sep. 27, 2024

(65) Prior Publication Data

US 2025/0097461 A1 Mar. 20, 2025

Related U.S. Application Data

(63) Continuation of application No. 17/669,343, filed on Feb. 10, 2022, now abandoned, which is a (Continued)

(51) Int. Cl.
*H04N 19/597* (2014.01)
*H04N 19/136* (2014.01)

(Continued)

(52) U.S. Cl.
CPC ......... *H04N 19/597* (2014.11); *H04N 19/136* (2014.11); *H04N 19/179* (2014.11); *H04N 19/31* (2014.11)

(58) Field of Classification Search
CPC .. H04N 19/597; H04N 19/136; H04N 19/179; H04N 19/31
See application file for complete search history.

(56) References Cited

U.S. PATENT DOCUMENTS 4,278,095 A 7/1981 Lapeyre
4,512,567 A 4/1985 Phillips (Continued)

OTHER PUBLICATIONS

"NeRF: Representing Scenses as Neural Radiance Fields for View Synthesis," European Conference on Computer Vision, ECCV 2020: Computer Vision—ECCV 2020 pp. 405-421—Abstract Only.

(Continued)

*Primary Examiner* — On S Mung
(74) *Attorney, Agent, or Firm* — Hamilton, Brook, Smith & Reynolds, P.C.

(57) ABSTRACT

A computer-implemented method for encoding a scene volume includes: (a) identifying features of a scene volume that are within a camera perspective range with respect to a default camera perspective; (b) converting the identified features into rendered features; and (c) sorting the rendered features into a plurality of scene layers, each including corresponding depth, color, and transparency maps for the respective rendered features. Further, (a), (b), and (c) may be repeated, operating on temporally ordered scene volumes, to produce and output a sequence encoding a video. Corresponding systems and non-transitory computer-readable media are disclosed for encoding a 3D scene and for decoding an encoded 3D scene. Efficient compression, transmission, and playback of video describing a 3D scene can be enabled, including for virtual reality displays with updates based on a changing perspective of a user viewer for variable-perspective playback.

16 Claims, 13 Drawing Sheets
(2 of 13 Drawing Sheet(s) Filed in Color)

Related U.S. Application Data continuation-in-part of application No. 17/668,373, filed on Feb. 9, 2022, now abandoned.

(60) Provisional application No. 63/181,820, filed on Apr. 29, 2021.

(51) Int. Cl.
*H04N 19/179* (2014.01)
*H04N 19/31* (2014.01)

(56) References Cited

U.S. PATENT DOCUMENTS

| | | | |
|---|---|---|---|
| 4,630,817 | A | 12/1986 | Buckley |
| 4,720,789 | A | 1/1988 | Hector et al. |
| 5,001,632 | A | 3/1991 | Hall-Tipping |
| 5,240,417 | A | 8/1993 | Smithson et al. |
| 5,246,411 | A | 9/1993 | Rackman et al. |
| 5,277,678 | A | 1/1994 | Friedebach et al. |
| 5,308,296 | A | 5/1994 | Eckstein |
| 5,362,069 | A | 11/1994 | Hall-Tipping |
| 5,385,519 | A | 1/1995 | Hsu et al. |
| 5,462,503 | A | 10/1995 | Benjamin et al. |
| 5,466,200 | A | 11/1995 | Ulrich et al. |
| 5,782,639 | A | 7/1998 | Beal |
| 6,004,243 | A | 12/1999 | Ewert |
| 6,142,913 | A | 11/2000 | Ewert |
| 6,152,856 | A | 11/2000 | Studor et al. |
| 8,075,450 | B2 | 12/2011 | Fabbri et al. |
| 8,083,647 | B2 | 12/2011 | Park |
| 8,979,710 | B2 | 3/2015 | Mccready et al. |
| 2002/0055419 | A1 | 5/2002 | Hinnebusch |
| 2002/0061131 | A1 | 5/2002 | Sawhney et al. |
| 2003/0134714 | A1 | 7/2003 | Oishi et al. |
| 2004/0038779 | A1 | 2/2004 | Kuo |
| 2004/0038780 | A1 | 2/2004 | Kuo |
| 2004/0103146 | A1 | 5/2004 | Park |
| 2004/0171460 | A1 | 9/2004 | Park |
| 2005/0075213 | A1 | 4/2005 | Arick |
| 2005/0195128 | A1 | 9/2005 | Sefton |
| 2005/0221960 | A1 | 10/2005 | Miyamaru et al. |
| 2005/0239601 | A1 | 10/2005 | Thomas |
| 2006/0063644 | A1 | 3/2006 | Yang |
| 2006/0122035 | A1 | 6/2006 | Felix |
| 2006/0229163 | A1 | 10/2006 | Waters |
| 2007/0042868 | A1 | 2/2007 | Fisher et al. |
| 2007/0219050 | A1 | 9/2007 | Merril |
| 2008/0015089 | A1 | 1/2008 | Hurwitz et al. |
| 2008/0022348 | A1 | 1/2008 | Shen |
| 2008/0102424 | A1 | 5/2008 | Holljes |
| 2009/0011907 | A1 | 1/2009 | Radow et al. |
| 2009/0098980 | A1 | 4/2009 | Waters |
| 2009/0111670 | A1 | 4/2009 | Williams |
| 2009/0124938 | A1 | 5/2009 | Brunner |
| 2009/0209393 | A1 | 8/2009 | Crater et al. |
| 2009/0326341 | A1 | 12/2009 | Furlan |
| 2010/0004097 | A1 | 1/2010 | D'Eredita |
| 2010/0009762 | A1 | 1/2010 | Takeda et al. |
| 2010/0009809 | A1 | 1/2010 | Carrington |
| 2010/0062818 | A1 | 3/2010 | Haughay et al. |
| 2010/0091548 | A1 | 4/2010 | Reed et al. |
| 2010/0222179 | A1 | 9/2010 | Temple et al. |
| 2010/0248900 | A1 | 9/2010 | Ashby et al. |
| 2010/0261579 | A1 | 10/2010 | Rice |
| 2011/0082009 | A1 | 4/2011 | Ranky et al. |
| 2011/0131005 | A1 | 6/2011 | Ueshima et al. |
| 2011/0164044 | A1 | 7/2011 | Huang |
| 2011/0177914 | A1 | 7/2011 | Park |
| 2011/0205226 | A1 | 8/2011 | Gremse et al. |
| 2011/0237399 | A1 | 9/2011 | Toback et al. |
| 2012/0046144 | A1 | 2/2012 | Lin et al. |
| 2012/0277891 | A1 | 11/2012 | Aragones et al. |
| 2012/0295764 | A1 | 11/2012 | Brammer |
| 2013/0059698 | A1 | 3/2013 | Barton |
| 2013/0132910 | A1 | 5/2013 | Belmon |
| 2013/0171599 | A1 | 7/2013 | Bleich et al. |
| 2013/0178334 | A1 | 7/2013 | Brammer |
| 2013/0178337 | A1 | 7/2013 | Brammer |
| 2013/0190135 | A1 | 7/2013 | Pryor |
| 2013/0210579 | A1 | 8/2013 | Schieffer et al. |
| 2014/0266989 | A1 | 9/2014 | Takahashi et al. |
| 2014/0274567 | A1 | 9/2014 | Mccready et al. |
| 2016/0023081 | A1 | 1/2016 | Popa-Simil et al. |
| 2021/0165481 | A1* | 6/2021 | Brugarolas Brufau ...................... A63F 13/67 |
| 2021/0397126 | A1 | 12/2021 | Hornstein et al. |
| 2021/0402281 | A1 | 12/2021 | Mccready et al. |
| 2022/0111283 | A9 | 4/2022 | Mccready et al. |
| 2022/0353486 | A1 | 11/2022 | Mccready et al. |
| 2022/0353530 | A1 | 11/2022 | Mccready et al. |

OTHER PUBLICATIONS

Broxton, et al., "Immersive Light Field Video With a Layered Mesh Representation," ACM Trans. Graph., vol. 39, No. 4, Article 86, Jul. 2020; pp. 86:1-86:15.

DuVall, et al., "Compositing light field video using multiplane images," SIGGRAPH '19: ACM SIGGRAPH 2019 Posters, Jul. 2019, Article No. 67, pp. 1-2—Abstract Only.

Flynn, et al., "DeepView: View synthesis with learned gradient descent," CVF, 2367-2376, no date provided.

Lin, et al., "Deep 3D Mask Volume for View Synthesis of Dynamic Scenes," University of California, San Diego, no date provided; 10 pages.

Liu, et al., "Neural Sparse Voxel Fields," 34th Conference on Neural Information Processing Systems (NeurIPS 2020), Vancouver, Canada; 13 pages.

Zhou, et al., "Stereo Magnification: Learning view synthesis using multiplane images," CM Trans. Graph., vol. 37, No. 4, Article 65, Aug. 2018, pp. 65:1-65:12.

* cited by examiner

METHOD AND SYSTEM FOR ENCODING A 3D SCENE

RELATED APPLICATIONS

This application is a continuation of U.S. application Ser. No. 17/669,343, filed on Feb. 10, 2022, which is a continuation-in-part of U.S. application Ser. No. 17/668,373, filed on Feb. 9, 2022, which claims the benefit of U.S. Provisional Application No. 63/181,820, filed on Apr. 29, 2021. The entire teachings of the above applications are incorporated herein by reference.

BACKGROUND

Several kinds of 6 degree-of-freedom (6 DoF) displays have been produced and sold, and their users are interested in viewing 3D scenes with these displays. To maintain a sense of presence, as well as to maintain viewer comfort, the display of a 3D scene to a user must take into account changes in the user's (viewer's) head pose and adjust the displayed perspectives to match the changes.

An existing application, BitGym™, allows users working out on exercise machines, such as cardiovascular (cardio) exercise machines, to be transported to far away locations virtually.

SUMMARY

There is a need for a 3D video format that allows for efficient compression, transmission, and playback of video describing a 3D scene. Such 3D scenes can be displayed to a user via a (6 DoF) 6 degree-of-freedom display, such as a virtual reality (VR) headset, an augmented reality (AR) headset, or a holographic display. Further, it is desirable that, while observing a 3D scene, a viewer may be enabled to move or rotate their head and be presented with an appropriately rendered perspective. However, existing formats do not achieve a combination of efficient compression, transmission, and playback while also providing variable-perspective playback.

In accordance with some embodiments of the disclosed subject matter, a method, corresponding system, and one or more non-transitory computer-readable media, such as software, are provided and can be used for, or as part of, compressing, transmitting, decompressing, and/or displaying a 3D scene. Embodiments achieve a combination of efficient compression, transmission, and playback while also providing variable-perspective playback. Such advantages can be realized in various systems such as by streaming content from a server, over an internet connection, and providing a 3D display to a user via a receiving client device.

Embodiments illustrated and described herein as necessary for an understanding by those of ordinary skill in the relevant arts include the following.

In one embodiment, a computer-implemented method for encoding a scene volume includes: (a) identifying features of a scene volume that are within a camera perspective range with respect to a default camera perspective; (b) converting the identified features into rendered features; and (c) sorting the rendered features into a plurality of scene layers. Each respective scene layer of the plurality of scene layers includes, for respective rendered features that are sorted into the respective scene layer: (i) a corresponding depth map for the respective rendered features, the depth map based on depth information from the scene volume, (ii) a corresponding color map for the respective rendered features, and (iii) a corresponding transparency map for the respective rendered features.

Sorting the rendered features into the plurality of scene layers can include sorting by depth of the rendered features, sorting by proximity of the rendered features to each other, sorting by type of rendered feature, sorting by other parameters, or sorting by a combination of parameters.

The method can further include writing the plurality of scene layers to a non-transitory computer-readable medium, such as to a computer's memory.

The method can further include constructing the scene volume using sequential color images captured by a camera. As an alternative, the method can further include constructing the scene volume using a single frame from a camera. In the case of a single frame, constructing the scene volume can include, for example, inferring, using a machine learning model, one or more features that are occluded from the single frame.

The method can further include repeating (a) identifying, (b) converting, and (c) sorting, for a respective plurality of temporally ordered scene volumes, to produce a sequence of temporally ordered pluralities of scene layers. The sequence of pluralities of scene layers can further be encoded to create a compressed sequence. In one variation of the embodiment, the method further includes packaging each plurality of scene layers into a series of image files, and then compressing the series of image files into a respective video file corresponding to the respective plurality of scene layers.

In another embodiment, a system for encoding a scene volume includes one or more processors configured to: (a) identify features of a scene volume that are within a camera perspective range with respect to a default camera perspective; (b) convert the identified features into rendered features; and (c) sort the rendered features into a plurality of scene layers. Each respective scene layer of the plurality of scene layers includes, for respective rendered features that are sorted into the respective scene layer: (i) a corresponding depth map for the respective rendered features, the depth map based on depth information from the scene volume, (ii) a corresponding color map for the respective rendered features, and (iii) a corresponding transparency map for the respective rendered features.

The system can further include a non-transitory computer-readable medium, and the one or more processors can be further configured to output the plurality of scene layers for storage in the non-transitory computer-readable medium.

The one or more processors can be further configured to: receive a plurality of temporally ordered scene volumes; to identify, convert, and sort according to (a), (b), and (c), respectively; and to output a sequence of pluralities of scene layers into the non-transitory computer medium.

In yet another embodiment, a computer-implemented method for generating a encoded scene volume includes: (a) assigning depth to respective features of a scene volume based on respective depth maps of respective scene layers, the respective scene layers being of a plurality of scene layers of an encoded scene volume; (b) assigning color to the respective features of the scene volume based on respective color maps of the respective scene layers; and (c) assigning transparency to the respective features of the scene volume based on respective transparency maps of the respective scene layers.

The method can further include receiving the plurality of scene layers. Receiving can be, for example, at one or more computer processors from one or more non-transitory computer-readable media over a computer bus, from a server over a network connection, or by other known means of receiving data in general, which will be understood by those or ordinary skill in the art in light of the description herein given the nature of data structures described herein.

The method can also include creating a rendered perspective from the scene volume.

The method can further include generating a plurality of temporally ordered scene volumes by repeating (a) assigning depth, (b) assigning color, and (c) assigning transparency, for each scene volume of a plurality of respective, temporally ordered, pluralities of scene layers.

In still another embodiment, a system for generating an encoded scene volume includes one or more processors configured to: (a) assign depth to respective features of a scene volume based on respective depth maps of respective scene layers, the respective scene layers being of a plurality of scene layers of an encoded scene volume; (b) assign color to the respective features of the scene volume based on respective color maps of the respective scene layers; and (c) assign transparency to the respective features of the scene volume based on respective transparency maps of the scene layers.

In still a further embodiment, one or more non-transitory, computer-readable media include instructions that, when executed by one or more processors, cause a device to: (a) identify features of a scene volume that are within a camera perspective range with respect to a default camera perspective; (b) convert the identified features into rendered features; and (c) sort the rendered features into a plurality of scene layers. Each respective scene layer of the plurality of scene layers includes, for respective rendered features that are sorted into the respective scene layer: (i) a corresponding depth map for the respective rendered features, the depth map based on depth information from the scene volume, (ii) a corresponding color map for the respective rendered features, and (iii) a corresponding transparency map for the respective rendered features.

In yet a further embodiment, one or more non-transitory, computer-readable media include instructions that, when executed by one or more processors, cause a device to: (a) assign depth to respective features of a scene volume based on respective depth maps of respective scene layers, the respective scene layers being of a plurality of scene layers of an encoded scene volume; (b) assign color to the respective features of the scene volume based on respective color maps of the respective scene layers; and (c) assign transparency to the respective features of the scene volume based on respective transparency maps of the scene layers.

Besides the summary of the embodiments given above, certain embodiments can be summarized as follows.

In one embodiment, a computer-implemented method, also referred to herein as packed MSR creation, includes: (i) receiving a scene volume able to be queried for features with respect to an input camera perspective; (ii) sorting the features into a plurality of scene layers, based on the depth of each feature (iii) combining the scene layers into an MSR; (iv) encoding the MSR into a packed MSR; (v) storing the packed MSR in a non-transitory computer-readable medium.

In another embodiment, also referred to herein as packed MSR video creation, a computer-implemented method includes encoding a plurality of temporally sequential representations of a 3D scene, each according to the packed MSR creation embodiment method described above, into a sequence of packed MSRs. These packed MSRs are then encoded into a sequence of 2D images which are assembled into a video which is compressed for storage or transmission.

In still another embodiment, also referred to herein as packed MSR decoding, a packed MSR is unpacked into a camera perspective, a depth map, a color map and a transparency map which are assembled into an MSR.

In still another embodiment, also referred to herein as packed MSR video decoding, packed MSR video is decoded into a sequence of packed MSRs which are each decoded and assembled into MSRs, which are finally used to create a scene volume.

In a further embodiment, a computer-implemented method includes reducing the size of an input representation a scene volume into a preconfigured number of layers, where the perspective of a camera inside of the scene is used to determine relevant surface points and then for each surface point a layer placement decision is made such that the resulting placed surface points represent the scene from the perspective of the camera with less data than the input representation.

The placed surface points may be converted into a 2D array of pixels where each pixel is mapped to the angular offset from the camera perspective.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

Figure 1:
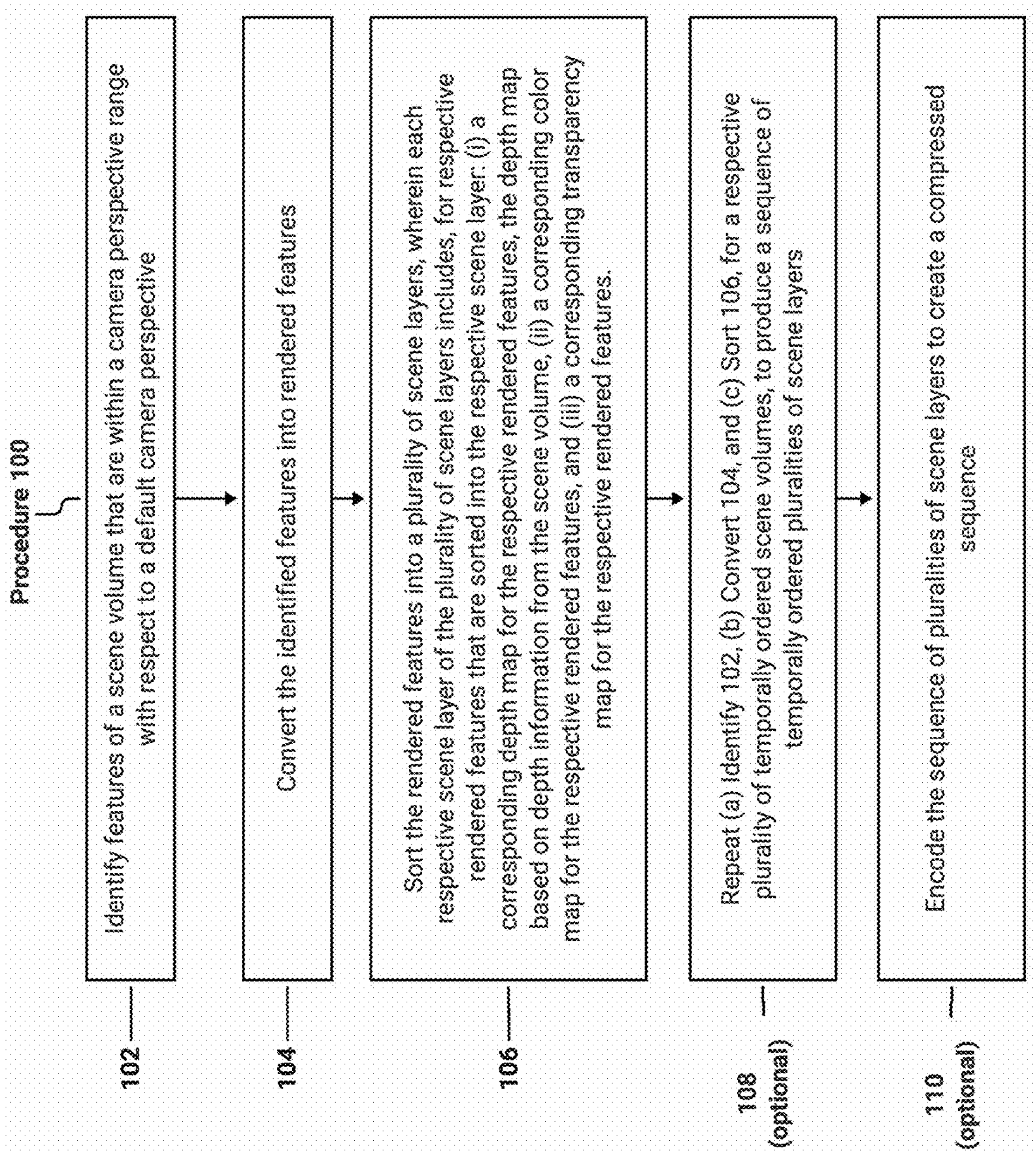
FIG. 1 shows an illustrative example of a process for generating an MSR from a scene volume.

The foregoing will be apparent from the following more particular description of example embodiments, as illustrated in the accompanying drawings in which like reference characters refer to the same parts throughout the different views. The drawings are not necessarily to scale, emphasis instead being placed upon illustrating embodiments.

Figure 13:
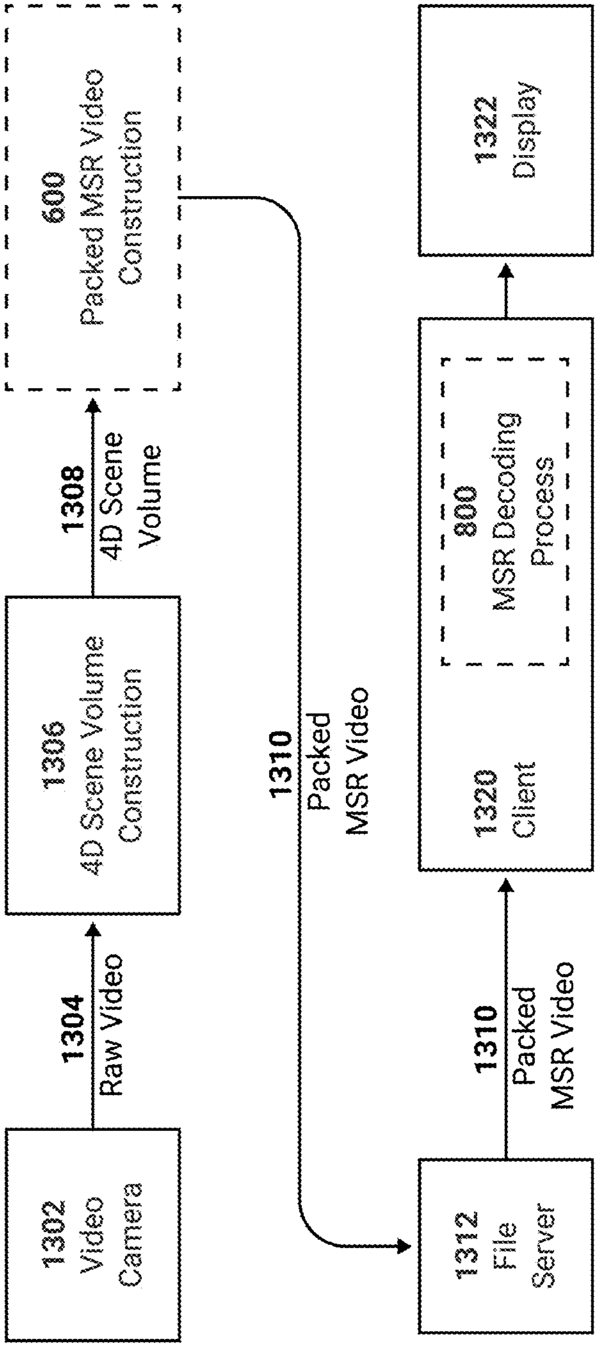

FIG. 13 is a block flow diagram illustrating a process of capturing a 3D video from a real-world location and encoding and transmitting it to a client for decoding and display.

DETAILED DESCRIPTION

A description of example embodiments follows.

An existing application, BitGym™, allows users working out on exercise machines, such as cardiovascular (cardio) exercise machines, to be transported to far away locations virtually and progress through forward-motion video (FMV) while they exercise. In the virtual environment, users can be immersed in landscapes where they progress through the landscape at the speed of their own exercise.

However, it is desirable to present users a 3D version of these landscapes on a six-degree-of-freedom (6 DoF) display which can display several perspectives around the original perspective from which the original camera observed the scene, because as users exercise, their heads will move, thus requiring a change in perspective from which the video is played back in order to be realistic. However, existing formats do not achieve a combination of efficient compression, transmission and playback while also providing variable-perspective playback.

Certain three-dimensional 6 DoF displays are capable of rendering 3D video to a user/observer, but the available 3D video formats that are used as input to this process are very nascent. The most common format, stereo packed video, transmits a 3D scene representation but only from a single perspective point and single rotation, meaning if a viewer moves their head or tilts their head, the illusion of viewing the originally captured scene will be broken. Red blue green and depth information (RGBD) video will allow presentation to both eyes at any focal distance and will look correct from any head tilt or rotation. However, RGBD video presentations will still look incorrect and unrealistic if the viewer translates their head. There are experimental systems that send much more of the 3D scene, resulting in renderings that are more correct and realistic, but these experimental systems result in impractically large file sizes that are not suitable for streaming on consumer internet connections.

The new methods described herein yield at least three benefits over existing methods, systems, and video compression formats. First, because the viewer can observe the scene from a perspective a distance away from the original camera position, a viewer in a VR headset can move or rotate their head and see believable projections of the original 3D scene, which increases realism and reduces the experience of motion sickness. Secondly, and also because the viewer can observe the scene from a perspective a distance away from the original camera position, the scene can be viewed from a virtual camera taking a smooth path even if the scene was generated with a camera which moved with an uneven path when capturing data. Third, the playback of packed MSR video when the camera is moving, as is the case for the BitGym™ immersive tours, allows for the client to convincingly display at an arbitrarily high frame rate by moving a virtual camera incrementally along the camera path in the reconstructed scene and interpolating between the rendered scene volumes created by the previous and next MSRs. One embodiment will demonstrate how a packed MSR video decoder can create and output rendered perspectives to a display at 60 frame per a second (fps) playback despite receiving packed MSR video containing just one packed MSR from per a second, and the advantage of such an embodiment is that in constrained bandwidth environments a client can select a stream with a lower frame rate instead of a stream with a lower resolution, preserving visual fidelity.

FIG. 1 is a block flow diagram illustrating a procedure 100 for encoding a scene volume, which can also be referred to herein as creating an MSR from a scene volume. At 102, a scene volume is queried for features within a camera perspective, and the returned features are identified. In particularly, features of a scene volume that are within a camera perspective range with respect to a default camera perspective are identified. At 104, the identified features are converted into rendered features. At 106, the rendered features are sorted, into a plurality of scene layers. Each respective scene layer of the plurality of scene layers includes, for respective rendered features that are sorted into the respective scene layer: (i) a corresponding depth map for the respective rendered features, the depth map based on depth information from the scene volume, (ii) a corresponding color map for the respective rendered features, and (iii) a corresponding transparency map for the respective rendered features.

As part of the sorting 106, each depth map, color map and transparency map can optionally be represented as a 2D array of values. Furthermore, as part of sorting 106, each depth map can optionally be represented as coordinates of a vertex mesh.

In some embodiments, the scene volume is first created using a series of sequential color images captured by a video camera. In other embodiments, the scene volume is first created using a single color image captured by a video camera. In yet other embodiments, the scene volume may be created or modified by a trained machine learning model. For example, such a machine learning model can use established techniques to take as input a photograph and to output a 3D representation of that photograph with depth as a scene volume. Furthermore, such a machine learning model can create occluded features in the scene volume not described in the original photograph Optionally, at 108, the procedure can also include repeating (a), (b), and (c) (identify 102, convert 104, and sort 106, respectively, as each of those elements is set forth particularly in the drawing and in the above description), for a respective plurality of temporally ordered scene volumes, to produce a sequence of temporally ordered pluralities of scene layers Also optionally, at 110, the procedure can include encoding the sequence of pluralities of scene layers to create a compressed sequence.

As will be understood by those of skill in the art, in various embodiments, the procedure 100 can be modified further to include any of the other optional elements described above in the Summary section above or in the embodiments illustrated in other drawings and described hereinafter.

Figure 2:
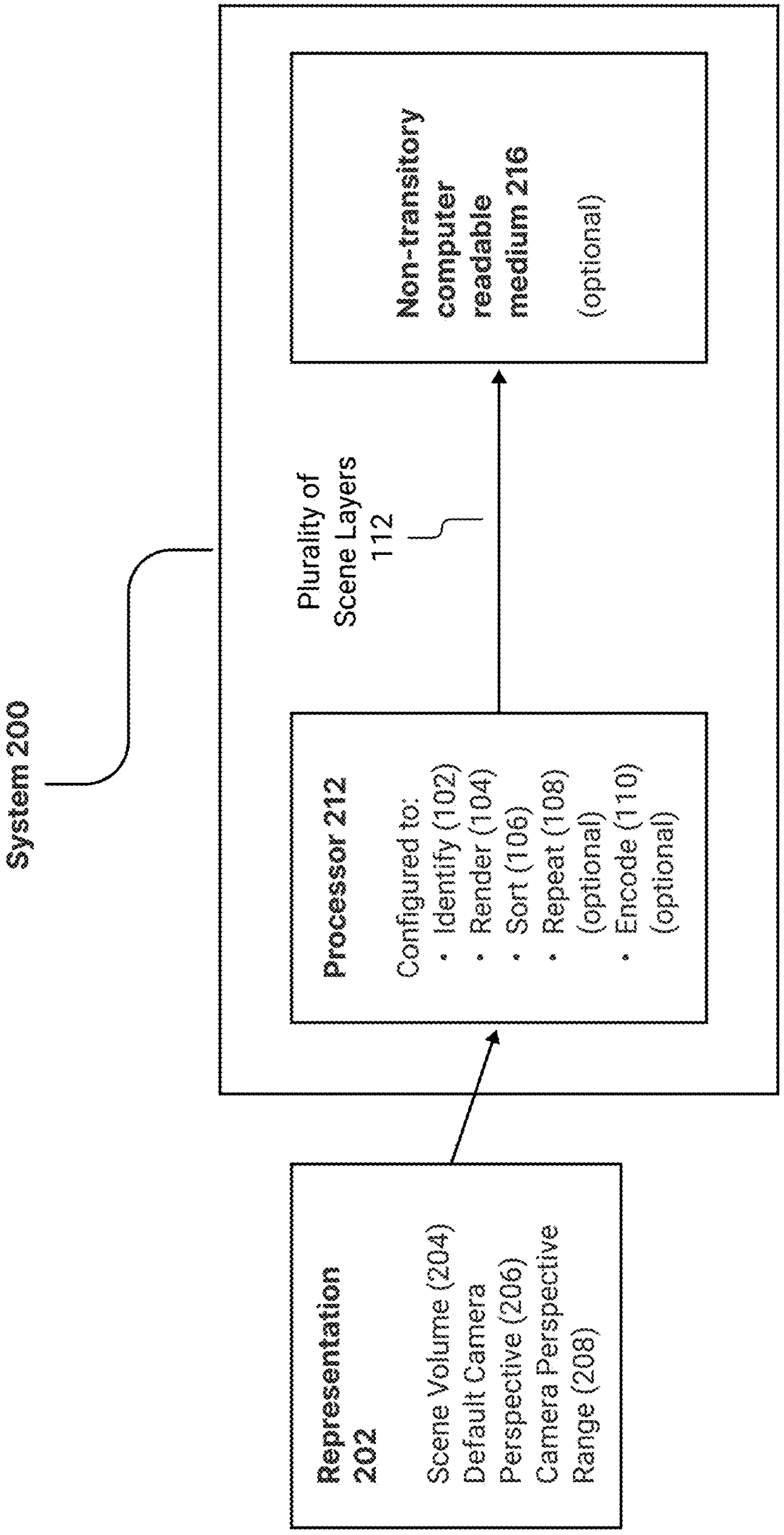
FIG. 2 shows an example of hardware that can be used in to execute the method described in FIG. 1

FIG. 2 is a block diagram illustrating an embodiment system 200 for encoding a scene volume, which is also referred to herein as creating an MSR from a scene volume. The system 200 includes one or more processors 212 that are configured to identify according to 102 in FIG. 1, to render (convert the identified features into rendered features) 104, and sort 106, according to the procedure illustrated in FIG. 1. In addition, optionally, the One or more processors 212 can be configured to repeat 108 and encode 110, according to the optional features illustrated in the procedure 100 of FIG. 1.

As also illustrated in FIG. 2, the processor may receive a representation 202 that includes various information to be used in the processing. This information can include a scene volume 204, a default camera perspective 206, and a camera perspective range 208, but more or less information may be provided in the representation 202. For example, in certain embodiments, the one or more processors 212 can execute instructions indicating for a camera perspective range to be assumed or automatically generated. The representation 202 can be received from one or more non-transitory computer-readable media such as computer memory, from a network location such as a server proving a stream, and the like.

The scene volume 204 can be queried for features within a camera perspective, such as illustrated at 102 in FIG. 1. The one or more processors 212 are further configured to render the identified features, sort the rendered features by depth, into a plurality of scene layers, based on the depth information from the camera perspective, such as illustrated at 106 in FIG. 1. In addition, the one or more processors 212 are configured to encode the features of the scene volume into a plurality of respective scene layers. This is also illustrated at 108 in FIG. 1.

Optionally, the system 200 may further include a non-transitory computer readable medium 216 to which the respective scene layers may be output, as illustrated in FIG. 2. In other embodiments, the system 200 does not include a non-transitory computer readable medium 216.

As will be understood by those of skill in the art, in various embodiments, the system 200 can be further configured, with appropriate modifications in hardware, software, firmware, or other means, to perform any of the other functions described above in connection with FIG. 1, the other drawings described hereinafter, or the additional embodiments described in the summary, for example.

Figure 3:
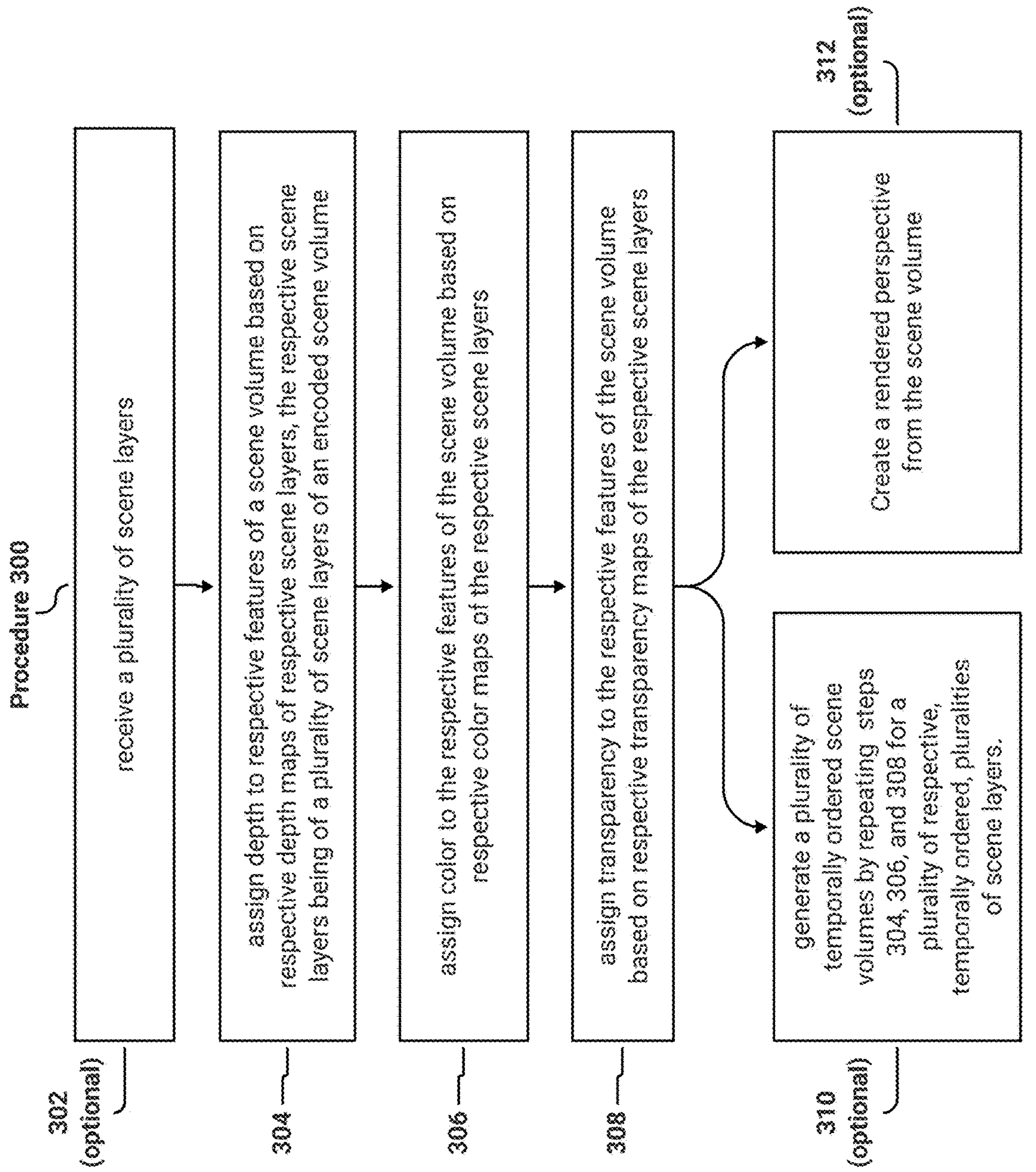
FIG. 3 shows an illustrative example of a process for generating a scene volume from an MSR

FIG. 3 is a block flow diagram illustrating a procedure 300 for generating an encoded scene volume, which is also referred to herein as creating rendered perspective from an MSR. Optionally, at 302, a plurality of scene layers is received, such as from a server via a network connection, from one or more non-transitory computer-readable media such as computer memory, or the like.

At 304, depth is assigned to respective features of a scene volume based on respective depth maps of respective scene layers, the respective scene layers being of a plurality of scene layers of an encoded scene volume. Thus, for each scene layer, the depth map is used to place features into a scene map. This projection function can assume a camera perspective, but such a perspective can be a preconfigured default. Some embodiments can receive a camera perspective along with a plurality of scene layers, and use this camera perspective to place the features in the scene volume.

At 306, color is assigned to the respective features of the scene volume based on respective color maps of the respective scene layers. Thus, for each scene layer, the color of placed features is set according to the color map. Similarly, at 308, transparency is assigned to the respective features of the scene volume based on respective transparency maps of the respective scene layers. Thus, the transparency of placed features is set according to the transparency map.

Optionally, at 310, a plurality of temporally ordered scene volumes may be generated by repeating 304, 306, and 308 for a plurality of respective, temporally ordered, pluralities of scene layers. Optionally, at 312, the generated scene volume can be used to create a rendered perspective. The rendered perspective can be created from a camera perspective inside of the newly created scene volume. The same camera perspective used to create the scene volume can be used. However, alternatively, a different nearby camera perspective can be used instead. In embodiments wherein a user is using a 6 DoF display, the camera perspective from which to create the rendered perspective can be determined by knowledge of the user's head position.

Figure 4:
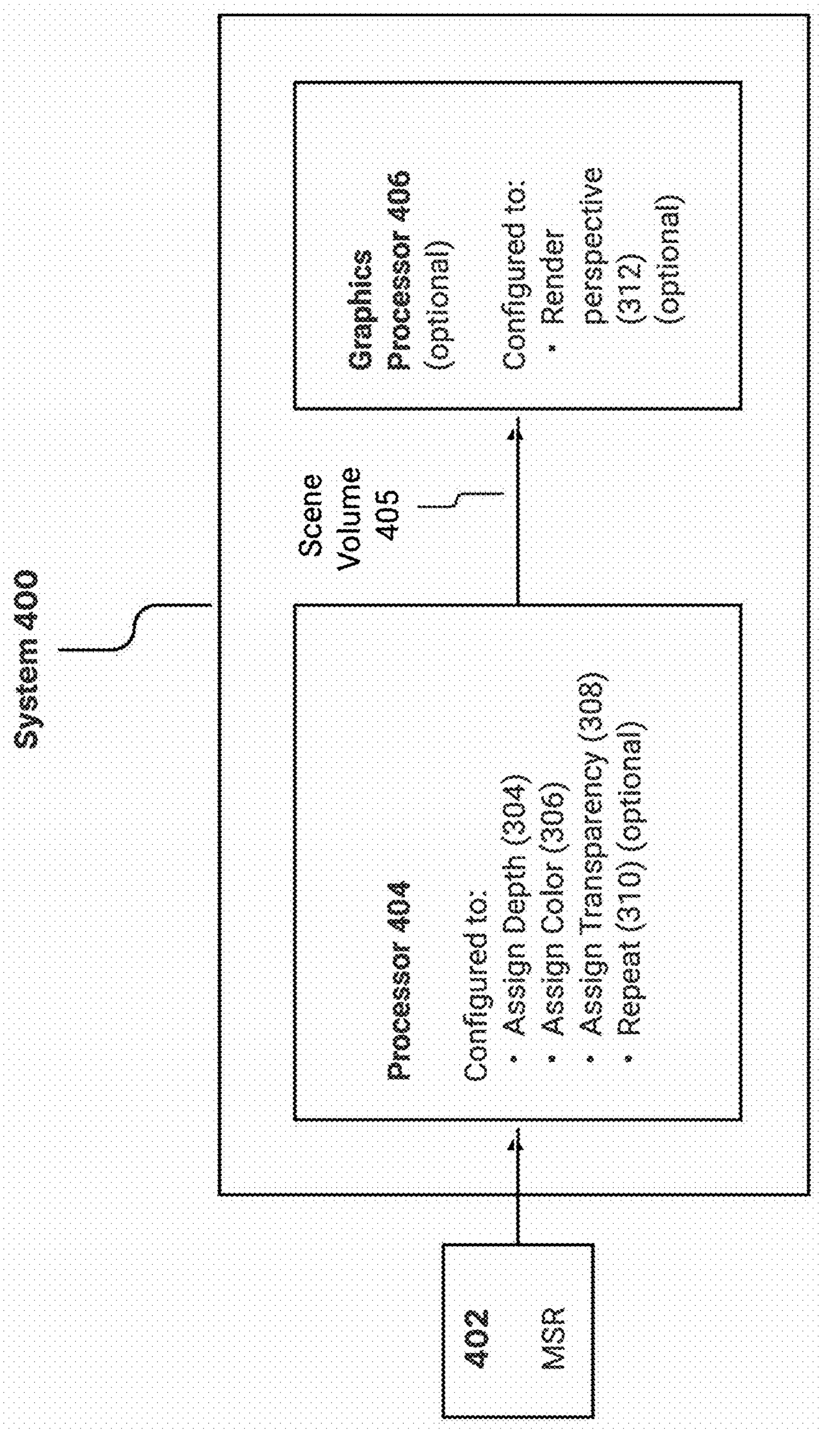
FIG. 4 shows an example of hardware that can be used in to execute the method described in FIG. 3

FIG. 4 is a block diagram illustrating an embodiment system 400 for generating an encoded scene volume, which is also referred to herein as creating a rendered perspective from an MSR. Optionally, in order to perform this function, one or more processors 404 in the system 400 can be configured to receive an MSR 402 and place the features described therein by its scene layers, such as is illustrated at 304 in FIG. 3, namely assigning depth according to 304. Similarly, the one or more processors 404 are further configured to set color and transparency of features such as are illustrated at 306 and 308, respectively, in FIG. 3. In addition, optionally, the one or more processors 404 can be configured to repeat 310 according to the optional features illustrated in the procedure 300 of FIG. 3.

The one or more processors 404 can optionally be configured to output a scene volume 405 and a camera perspective to an optional graphics processor 406. The graphics processor 406 is configured to create a rendered perspective 312 of a scene volume from the perspective of a camera perspective in the scene volumes coordinate system.

Figure 5:
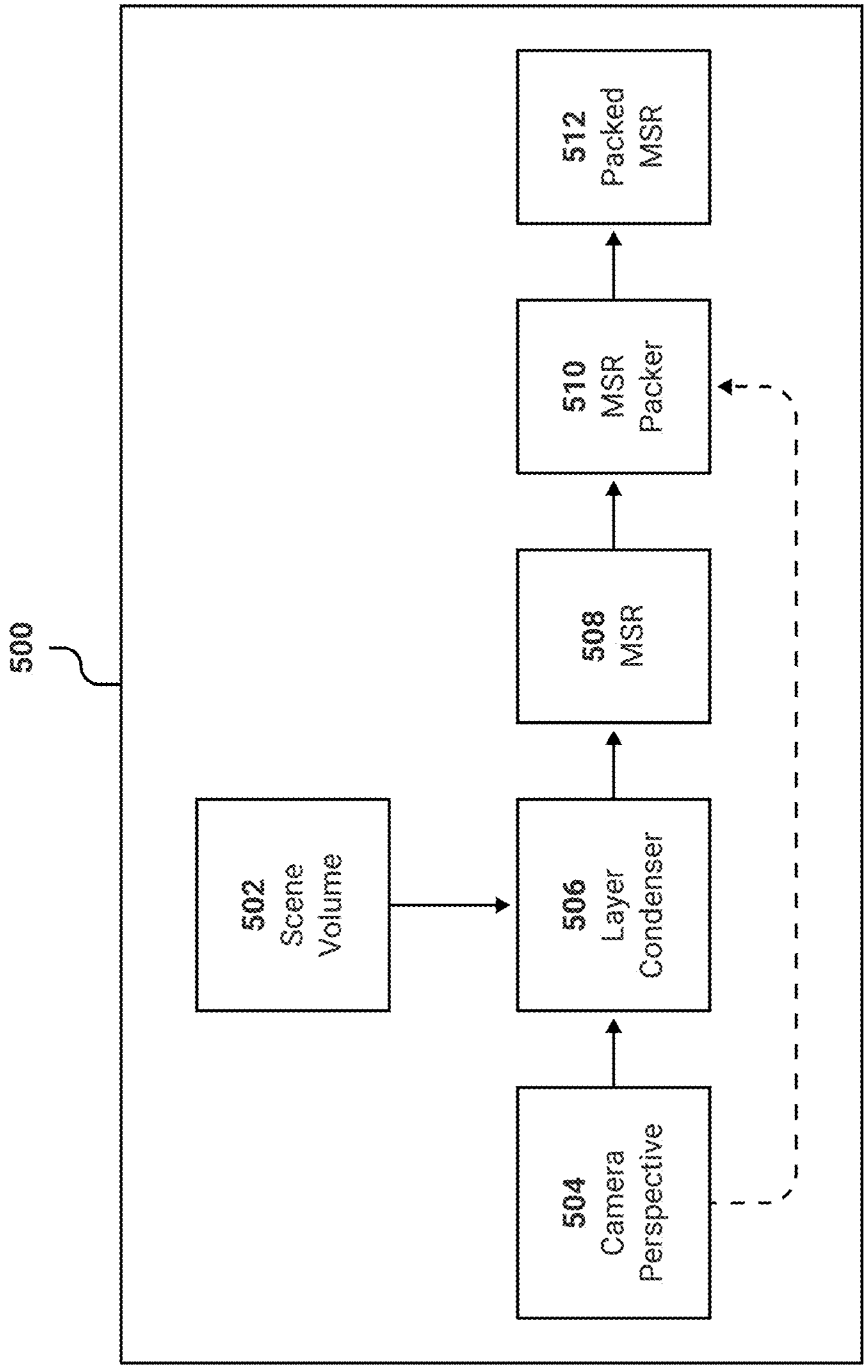
FIG. 5 shows an illustrative example of a process for generating packed MSR from a scene volume in accordance with some embodiments of the disclosed subject matter.

FIG. 5 is a block flow diagram illustrating the creation of a packed MSR 512 based on a camera perspective inside of a scene volume according to an embodiment. First a camera perspective 504 is passed to the layer condenser 506.

Figure 12:
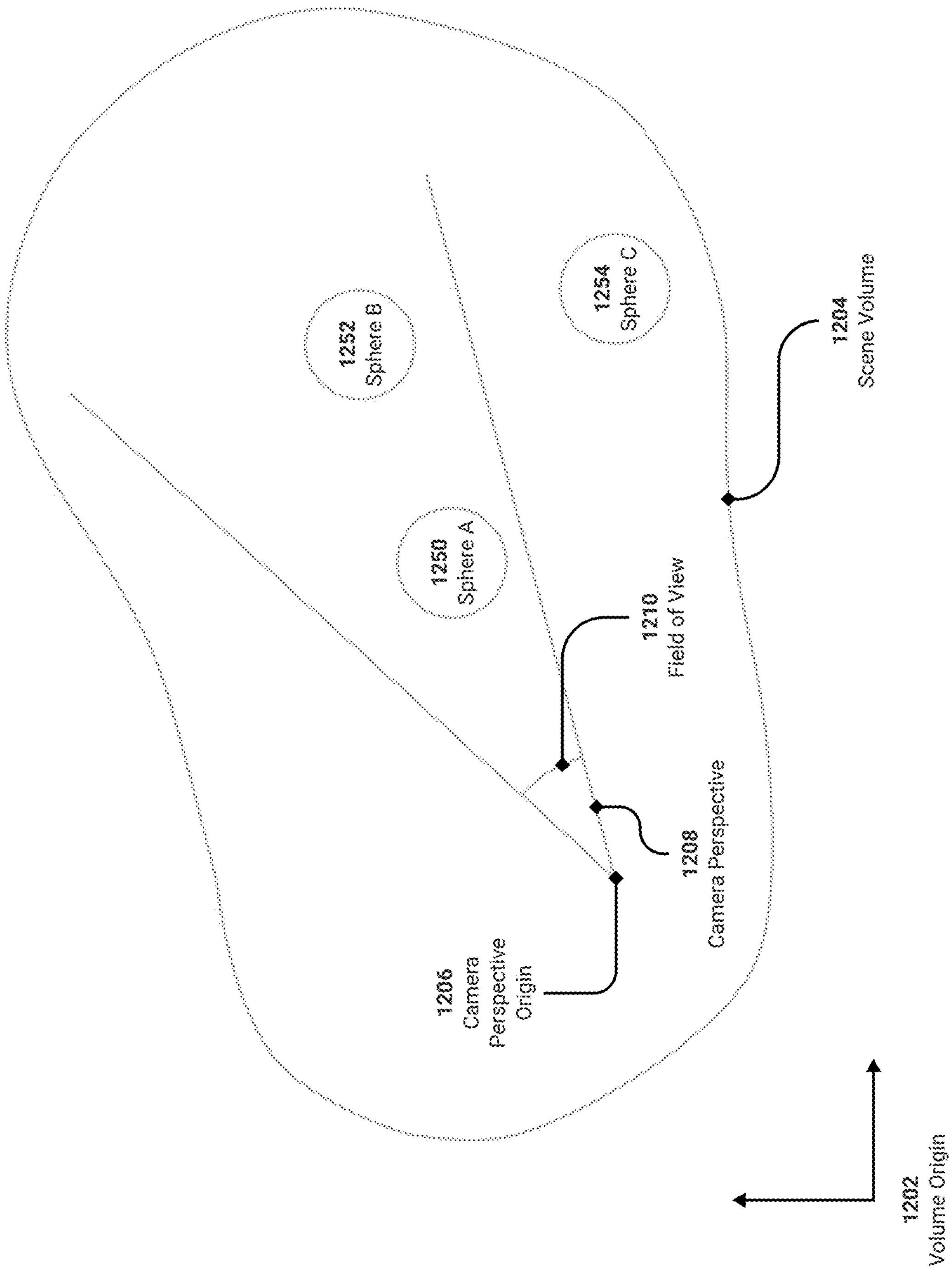
FIG. 12 shows a schematic diagram of how a scene volume can be queried by a camera perspective in accordance with some embodiments of the disclosed subject matter.

Next, the layer condenser queries the scene volume 502 for features within the camera perspective or anticipated camera perspectives in a locality around the camera perspective, a process illustrated in FIG. 12. An advantageous feature of 6 DoF video playback is that the viewer may move their viewing perspective inside of a range and when doing so they should be provided with a plausible view of the reconstructed 3D scene from that new perspective. The layer condenser 506 is configured to anticipate how large this viewing range is and will sample data from the scene volume 502 to accommodate all viewing perspectives inside of it. The layer condenser 506 will then condense this visual data from camera perspective 504, and perspectives nearby it, into a set of scene layers which together constitute an MSR 508. As used herein, a "multilayer scene representation" (MSR) is a plurality of scene layers describing a scene volume. An MSR may optionally describe the camera perspective used by each or all scene layers. An MSR includes at least two scene layers, each of the scene layers including a depth map, a color map, and a transparency map. However, in general, an MSR may include any number greater than two of scene layers, such as 2-4 scene layers, 3-5 scene layers, 5-10 scene layers, 3-10 scene layers, or more. Advantageously, some embodiments use 4 scene layers as an optimum balance between good scene description, representation, and encoding within the scene layers (which increases with the number of scene layers) and minimizing data size of an MSR (minimization of data structure size can be enhanced by using fewer scene layers).

Figure 7:
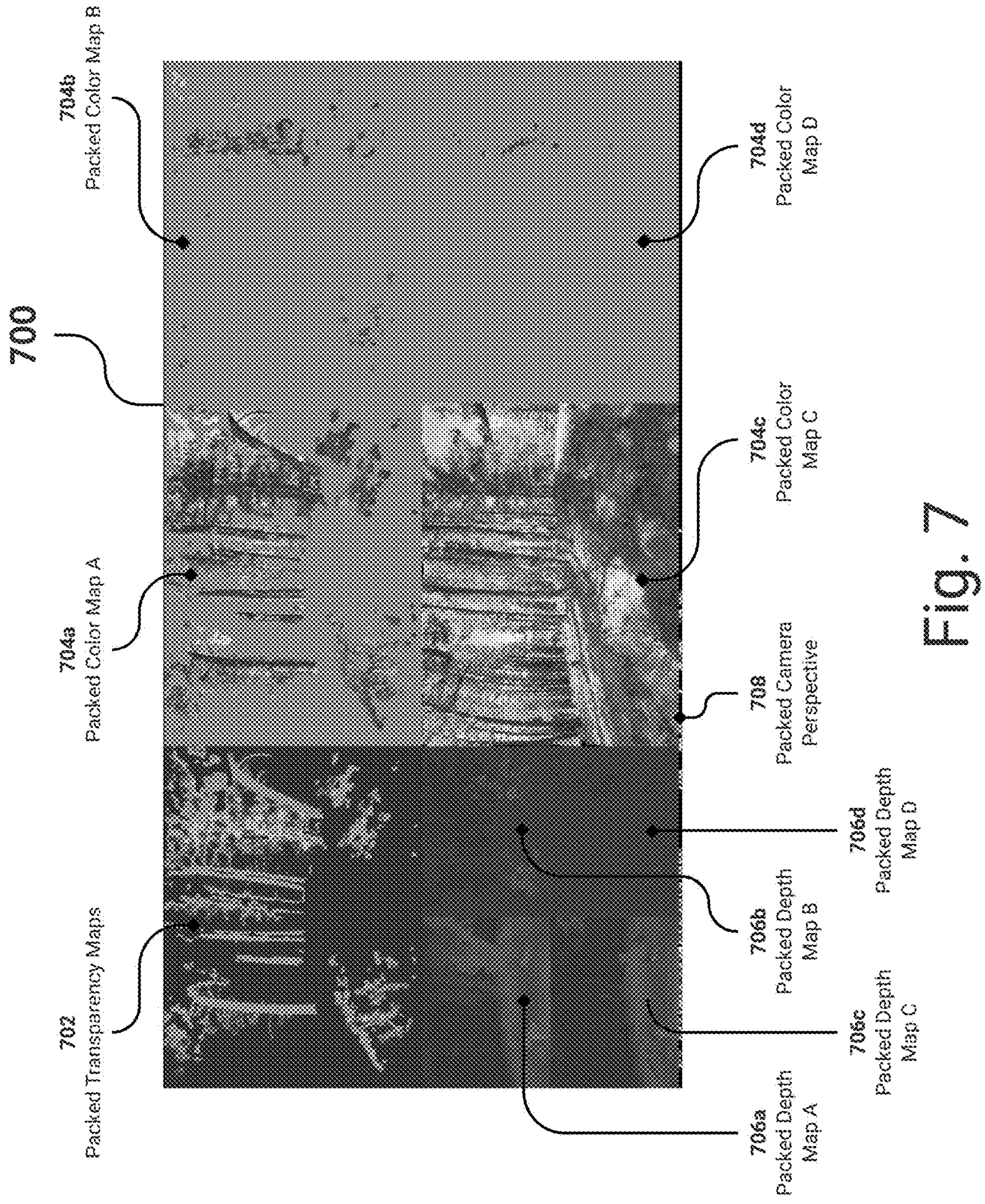
FIG. 7 is a schematic diagram of a packed MSR which holds an encoding of a single MSR accordance with some embodiments of the disclosed subject matter.

The MSR 508 is then passed to the MSR packer 510 which will encode the MSR component scene layers in 2D pixel array representations, and then pack them together into a single packed MSR 512, which is, in this embodiment, a 2D pixel array. The pixels in this 2D array are each a simple data structure with usually 3, and sometimes 4, channels of color information. A channel of color information is commonly described with 8 bits of information, but it can be as few as 4 or as many as 32, depending on the color space the embodiment is configured to work with. The output packed MSR 512 need not preserve all information which was present in the MSR 508, as a key advantage of this embodiment is to compress information describing a scene volume 502 into a smaller data structure for practical storage or transmission. The MSR packer 510 embodiment can be configured with different packing strategies depending on the number of scene layers it will receive, different output pixel formats and different 2D pixel array output sizes. A larger 2D pixel array will encode more visual detail, but will increase the storage and transmission size. A detailed description of a packed MSR 512, according to one embodiment, is shown in FIG. 7.

Optionally the camera perspective 504 can be passed to the MSR packer 510 so that the packed MSR contains a packed camera perspective.

The system and processes described in connection with FIG. 5 may be computer-implemented. For example, the scene volume 502, MSR 508 and packed MSR 512 can be stored in various types of memory, such as RAM or ROM memory. The layer condenser 506 and MSR packer 510 may be computer-executable code that may be capable of execution in one or more processors. In some embodiments, the processors can be embedded processors, and the computer-executable code may be firmware, while in other embodiments, the computer-executable code may be software.

The layer condenser is a very advantageous part of the overall system because it can take a data intensive or computationally intensive scene volume, which by itself may be impractical for viewing in real time due to bandwidth or computational limits, and condense the visual information able to be seen from a locality around a camera perspective into a much small representation suitable for storage, real-time playback or transmission over a network.

One Embodiment Layer Condenser

One embodiment of the layer condenser has specific characteristics and functions as follows.

The layer condenser receives a camera perspective, and with it queries a scene volume for rendered features relevant to that camera perspective, including those rendered features that would be occluded by other rendered features. The layer condenser stores the spatial coordinates of these rendered features in memory. As part of this process some of the rendered features may be determined as erroneous or otherwise irrelevant. Thus, rendered features finally committed to memory can be referred to as "relevant rendered features."

The layer condenser can be configured to output a number of scene layers, and the number should be at least 2 to be useful, while an example number of 4 is better. More generally, the number of scene layers may be greater than or equal to 2, or greater than or equal to 4. More preferably, the number of scene layers can be 4, 5, 6, 7 or 8, for example. Conceptually, each scene layer is a set of vertices in space where each vertex may be considered to be connected to its nearest neighbor vertex or vertices with a polygon edge. There is a relative order to the layers, where layer N+1 is further away from the camera, on average, than layer N. In order to sort the relevant rendered features into scene layers, the layer condenser may advantageously optimize for the following properties of the sorting:

a) Scene layers should preferably be maximally utilized. The most foreground scene layer should hold the nearest rendered features in a given angular offset from the camera perspective. If this angular offset contains rendered features which occlude other rendered features, these occluded features must be sorted into another layer or discarded. This process of sorting rendered features into scene layers, or discarding features which cannot be fit, is referred to as "sorting by depth." This will reduce representational load on subsequent scene layers. As the total number of scene layers is fixed, this strategy helps ensure that any visual features in the scene that are likely to be visible from and around the target camera perspective are represented in a scene layer before the MSR's capacity for representation is filled up.
b) Surfaces may often contain areas wherein a transition between scene layers is required. In such regions, it is advantageous to have at least one vertex of overlap ("seam") between the projection of the scene layers. In practice, it is preferred to have two vertices of overlap between projected scene layers. These "seams" are necessary to prevent "cracks" from appearing in a final rendering of the scene volume created from projected scene layers which overlap. Two vertices are preferred, because it is ultimately the triangles between vertices that can be rendered. Having two vertices also ensures that there is a continuous seam of overlapping triangles between projected scene layers; the vertices on all sides of those triangles will need to be the same between layers.
c) Whenever any single scene layer (except the most background layer) transitions from representing the rendered features of relatively nearby object to the rendered features of a relatively further away object it is desirable to ensure that the rendered features will ultimately be rendered without any visible seams or gaps along that transition. One way of achieving this is to redundantly represent the features of that object by each of the participating layers along their transition boundary.

Once the structure of scene layers has been determined, each will be assigned a 2D array to hold color and opacity data. In order to fill the 2D arrays with color and opacity information, an iterative approach may be employed whereby the estimated occlusion of rendered features by nearer rendered features from a number of observed perspectives is used to fill in colors, selectively, that should be visible from each perspective. The color for each rendered feature will vary by the perspective used to observe it, and so the final value selected for storage must be determined. In one configuration, this value is determined by taking a weighted average of colors from multiple camera perspectives inside of a camera perspective range, where the weights correspond to the inverse likelihood that the rendered feature was being occluded in each sampled camera perspective.

A difference between the weighted average color for each scene layer and the original observations is then used to refine the estimated opacity of each scene layer wherein a high enough difference in color indicates a high likelihood of occlusion and, therefore, an increased likelihood of opacity of the occluding scene layer. These improved opacity estimates can then be used to improve the occlusion estimation, which in turn can then be used to refine the color estimation. The back and forth refinement of opacity and color can be repeated for several iterations until a stable configuration emerges.

Figure 6:
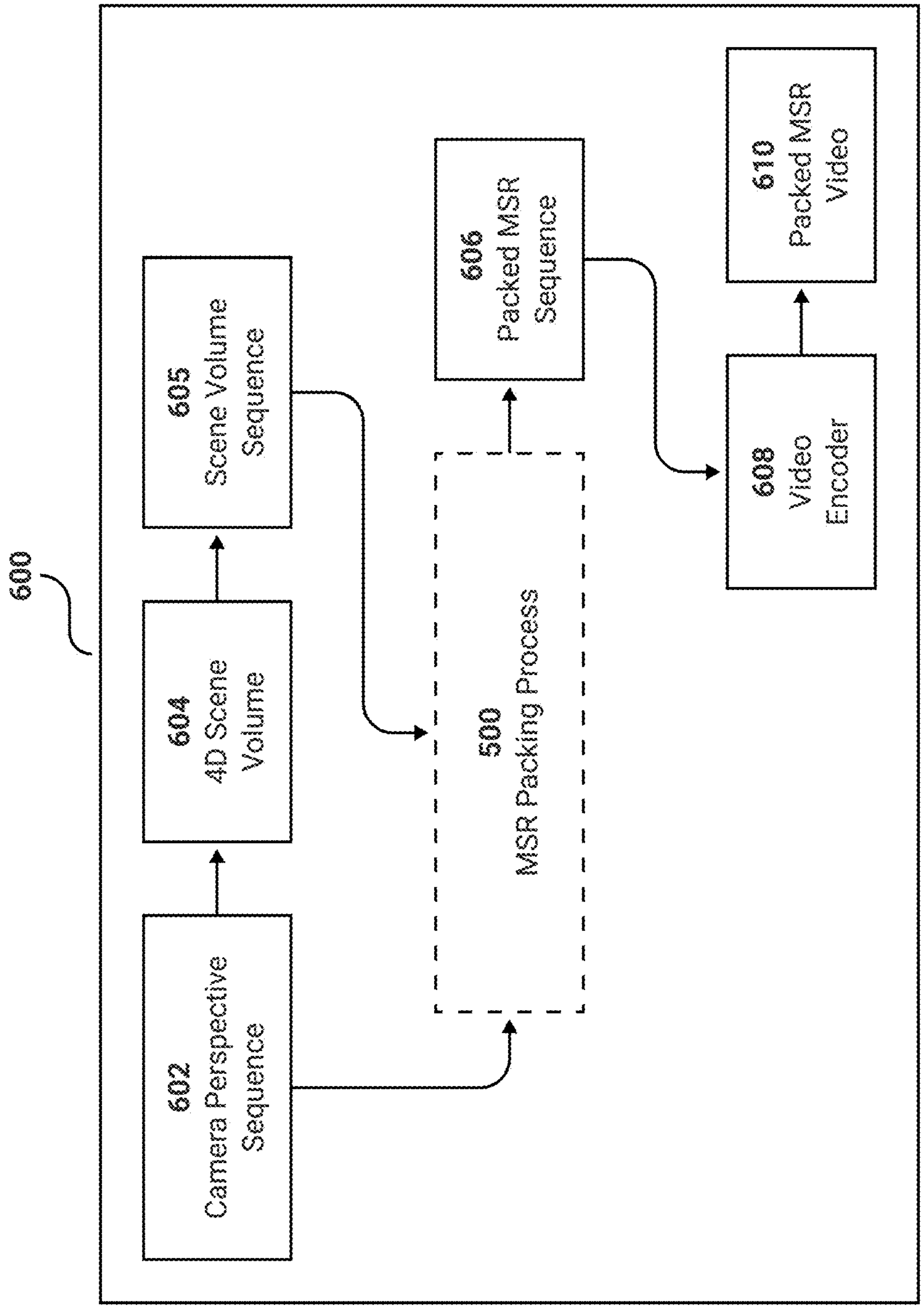
FIG. 6 shows an illustrative example of a process for generating packed MSR video from a 4D scene volume in accordance with some embodiments of the disclosed subject matter.

FIG. 6 is a block flow diagram illustrating a process for creating packed MSR video according to one embodiment. The process involves an iterative loop where the MSR packing process 500 is invoked multiple times. The number of times it is invoked depends on the length of the camera perspective sequence 602. 602 is a temporally ordered sequence, and so each entry has a time value. For each of the time values in 602 the 4D scene volume 604 is queried in order to produce a scene volume for that time, resulting in the temporally ordered scene volume sequence 605.

With a temporally ordered sequence of camera perspectives 602 and a temporally ordered scene volume sequence 605, both of which contain the same number of elements, MSR packing process 500 can be invoked in a loop for each pair of inputs and it will produce a packed MSR for each execution. The resulting temporally ordered packed MSR sequence 606

In this embodiment, each element of packed MSR sequence 606 is a packed MSR 512 (see FIG. 5), particularly in the form of a 2D pixel array representing a rectangular image. The sequence of these 2D pixel arrays is then passed to a video encoder 608 module in order to produce packed MSR video 610 suitable for storage or transmission.

In one configuration, a packed MSR is 3840 pixels wide and 2160 pixels tall, with three color channels per a pixel. In this configuration, a h265 video encoder would offer a good compression ratio and furthermore be a format which is easily decoded with the computing resources found in consumer grade computing devices available today. Such a packed MSR encoded to the h265 standard and embedded in a MPEG4 video container can then be streamed over the network to a VR headset, which can decode the stream into a series of MSRs, which can then be used to create a series of scene volumes, each of which can be used to present a rendered perspective to the VR headset display.

In general, when streaming video to a client, it is advantageous to use an adaptive bitrate system that scales up stream size based on available bandwidth. In the prior art, the generally accepted method is to reduce resolution and bitrate to accomplish this. However, in contrast to the prior art, the embodiments described herein make it possible to keep the per-frame resolution high while only reducing the frame rate of the packed MSR video. Packed MSR video can advantageously be viewed at arbitrarily high "frame rate" by stepping the virtual camera tiny amounts through the created scene volumes, and this feature can contribute significantly to achieving the combination of high resolution and reduced overall frame rate.

FIG. 7 shows the result of one packing strategy according to an embodiment of the MSR packer. Many variants of this strategy are also within the scope of this disclosure, as will be understood by those of ordinary skill in the art in reference to embodiments disclosed herein. The strategy is configured to accept an MSR which contains a camera perspective and four scene layers, where each scene layer contains a color map, depth map and transparency map. It is further configured to output to a 2D pixel array where each pixel has three color channels where each channel holds 8 bits of data.

In FIG. 7, packed color maps 704 *a, b, d* and *d* represent the color map information in the corresponding scene layers. Packed depth maps 706 *a, b, d* and *d* represent the depth map in the corresponding scene layers. The packed transparency maps 702 represent a composite of all four scene layer transparency maps. The packed camera perspective 708 is a strip of color values at the bottom of the frame which encodes the MSR camera perspective.

To composite the scene layer transparency maps (which are themselves 2D arrays of values) into a 2D array of three channel pixels, a transform function is applied such that fourth layer is assumed to be entirely opaque and can be omitted, and the first three transparency maps are encoded in the red, blue and green dimensions of the color space. Because these colors are distinct to human perception, modern video codecs are likely to preserve the distinction between these four dimensions during compression steps.

To fit the depth maps into the space available, and to keep the total representation size down, the packed depth maps are represented by 25% as many pixels as the color maps. A transform function is used to convert the input depth maps, which can be represented as high precision inside of a scene layer, into the likely lower precision 24 bits available across the three channels of each output pixel. This transform function is preferably non-linear such that pixels with smaller depth values, those representing visual features nearby the camera, are stored in higher resolution than those pixels with larger depth values.

Another embodiment of the MSR frame packer is designed to output 2D pixel arrays with four channels each. Such a four channel 2D pixel array can be encoded by some modern video codecs. In this embodiment, the color maps are packed into three channels and their corresponding transparency maps are packed into the fourth channel. To keep the output rectangular, the depth layers are arranged in a vertical column on the side.

These are two possible frame packing strategies, but there are many possible, especially when different frame sizes, pixel depth, or pixel striping strategies are used by the stream the frames are intended to be embedded in.

An especially advantageous aspect of embodiments is that, because an MSR can be packed into a 2D array of pixel values, common image and video codecs can be used for storage and transmission over a network. This allows for embodiments to take advantage of hardware accelerated encoders and decoders already available on consumer grade computing hardware. As the information in a packed MSR follows many of the same dynamics as a normal image (e.g. adjacent pixels tend to have similar values), and that similarly a sequence of packed MSR frames follow the same dynamics as a normal video (e.g. pixels tend not to change between frames) common image and video encoding techniques offer efficient compression of packed MSRs. Optionally, the layer condenser can be configured to output fewer scene layers for scenes with less complexity, and when this happens the resulting packed MSR frames will have blank regions which modern video codecs will compress extremely effectively. Additionally, it can be useful for the embodiment to anticipate the group of pictures (GOP) size and concentrate changes in adjacent frames to keyframes in the resulting video stream. One such method is to only change the location of the camera perspective at such keyframes.

Figure 8:
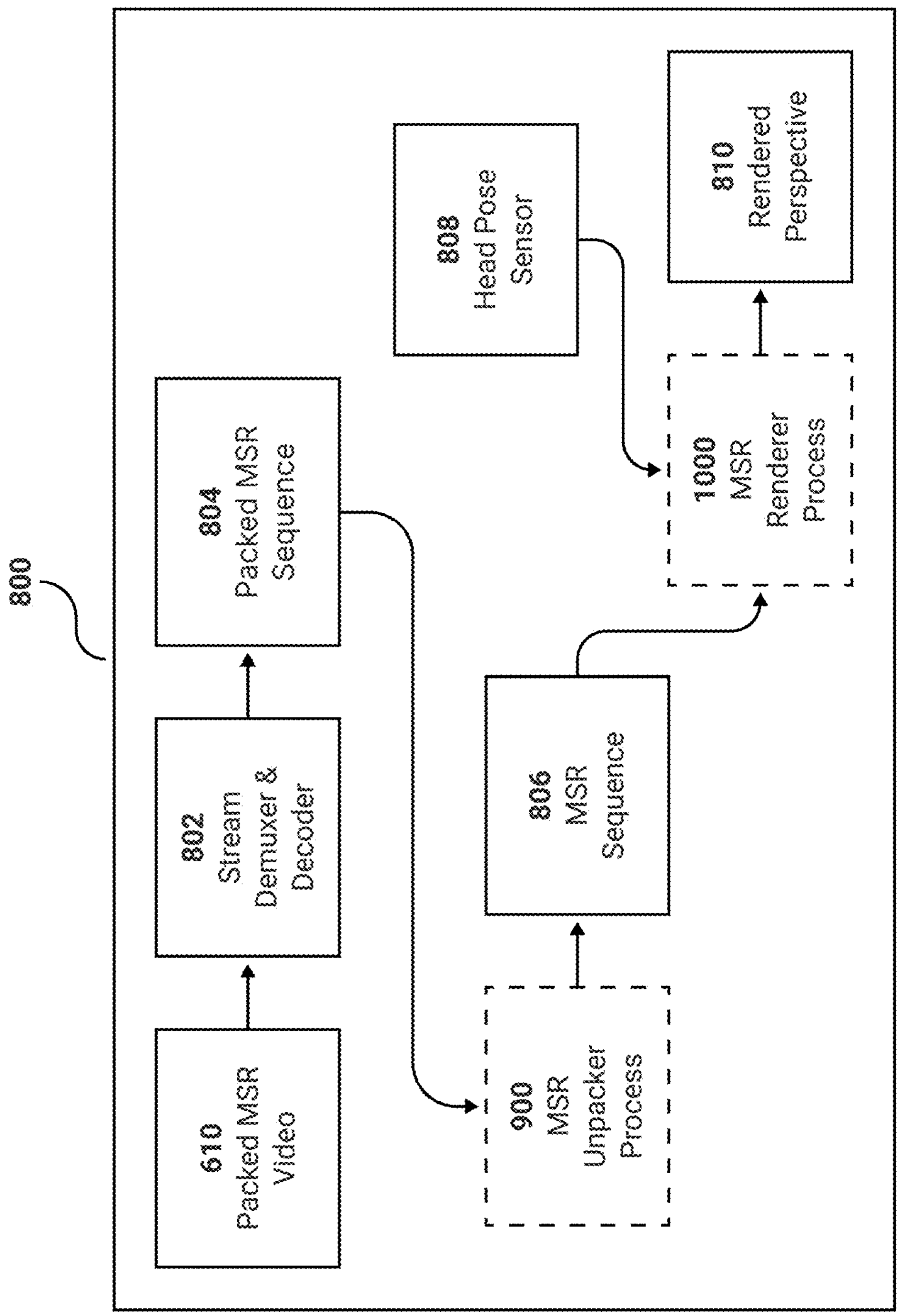
FIG. 8 shows an illustrative example of a process for decoding a packed MSR video into rendered perspectives in accordance with some embodiments of the disclosed subject matter.

FIG. 8 is a block flow diagram illustrating a process of decoding a packed MSR video 610 for creating rendered perspectives ready to be passed to a 6 DoF display, according to an embodiment. In this embodiment the packed MSR video 610 is a streamable media container containing an encoded video stream where the encoded video encodes a sequence of packed MSRs. Multiple media container formats, such as MP4 or MOV are viable here and this would be understood to anyone skilled in the art. Multiple video codecs, such as h264 or h265 are viable and this similarly would be understood to someone skilled in the art. The stream demuxer & decoder 802 is passed the packed MSR video 610 to extract the video stream and decode it into a packed MSR sequence 804. An embodiment of the MSR unpacker process 900 is described in detail in FIG. 9. The MSR unpacker process 900 is passed in every packed MSR frame, in order, and will output an MSR sequence 806.

As the MSR sequence 806 is output, each MSR is input to an MSR renderer process 1000, which will for each input create an output rendered perspective.

The render process optionally can be passed a user head pose along with the input MSR. In some embodiments the user head pose is observed with a head pose sensor 808, an example of which is the motion sensor in a VR headset.

Figure 9:
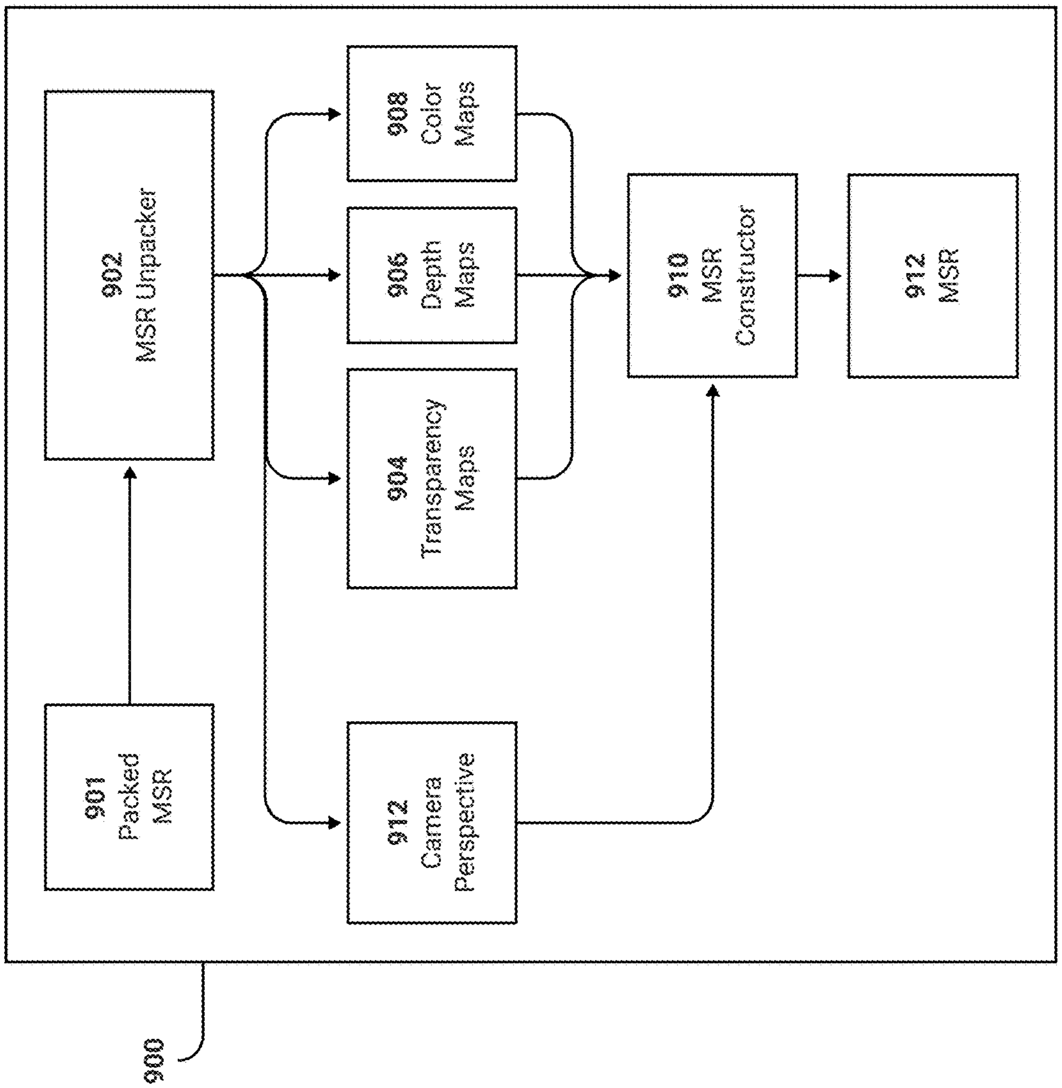
FIG. 9 shows an illustrative example of a process for unpacking a packed MSR into an MSR in accordance with some embodiments of the disclosed subject matter.

FIG. 9 is a block flow diagram illustrating a process of decoding a packed MSR into an MSR, according to an embodiment. First the packed MSR 901 is passed to the MSR unpacker 902 which identifies how it was originally packed and then extracts the data out into the camera perspective 912 and transparency maps 904, depth maps 906 and color maps 908.

The MSR constructor 910 is passed 904, 906, 908 and 912 and it will output a plurality of scene layers. These scene layers plus the camera perspective are the constituent parts of the MSR 912 which is the output of this module.

In some embodiments, the camera perspective 912 is not output from 902 and thus not input into 910 and thus not included in the output MSR data structure.

Figure 10:
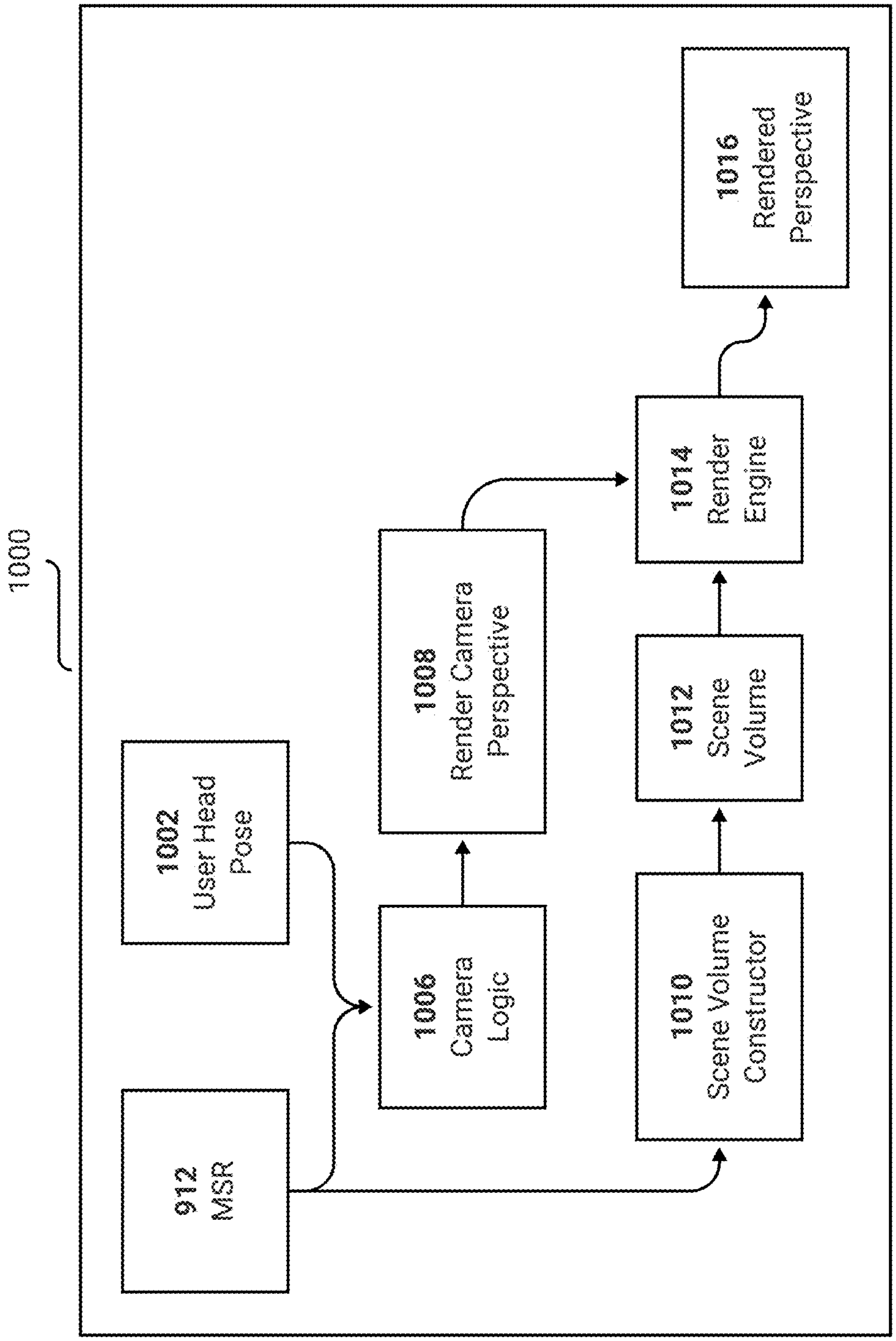
FIG. 10 shows an illustrative example of a process generating a rendered perspective from an MSR in accordance with some embodiments of the disclosed subject matter.

FIG. 10 is a block flow diagram illustrating a process of creating a rendered perspective from an MSR and optionally a user head pose, according to an embodiment. If the user head pose 1002 is passed as an input to this process, it is passed to the camera logic 1006. The camera logic 1006 is also passed the input MSR 912 in order to examine the MSR camera perspective. If the MSR does not include a camera perspective, a default one is assumed. The goal of 1006 is to produce a camera perspective with the coordinates in the scene volume which will produce a rendered perspective appropriate for the viewers head pose. In one embodiment the camera logic 1006 will remember previous values for the user head pose and use a time weighted average of these positions to represent the neutral viewing pose. If a user head pose deviates from this neutral viewing pose, the render camera perspective will contain the same deviation from the MSR camera perspective. The render camera perspective 1008 is then passed to the render engine 1014.

Figure 11:
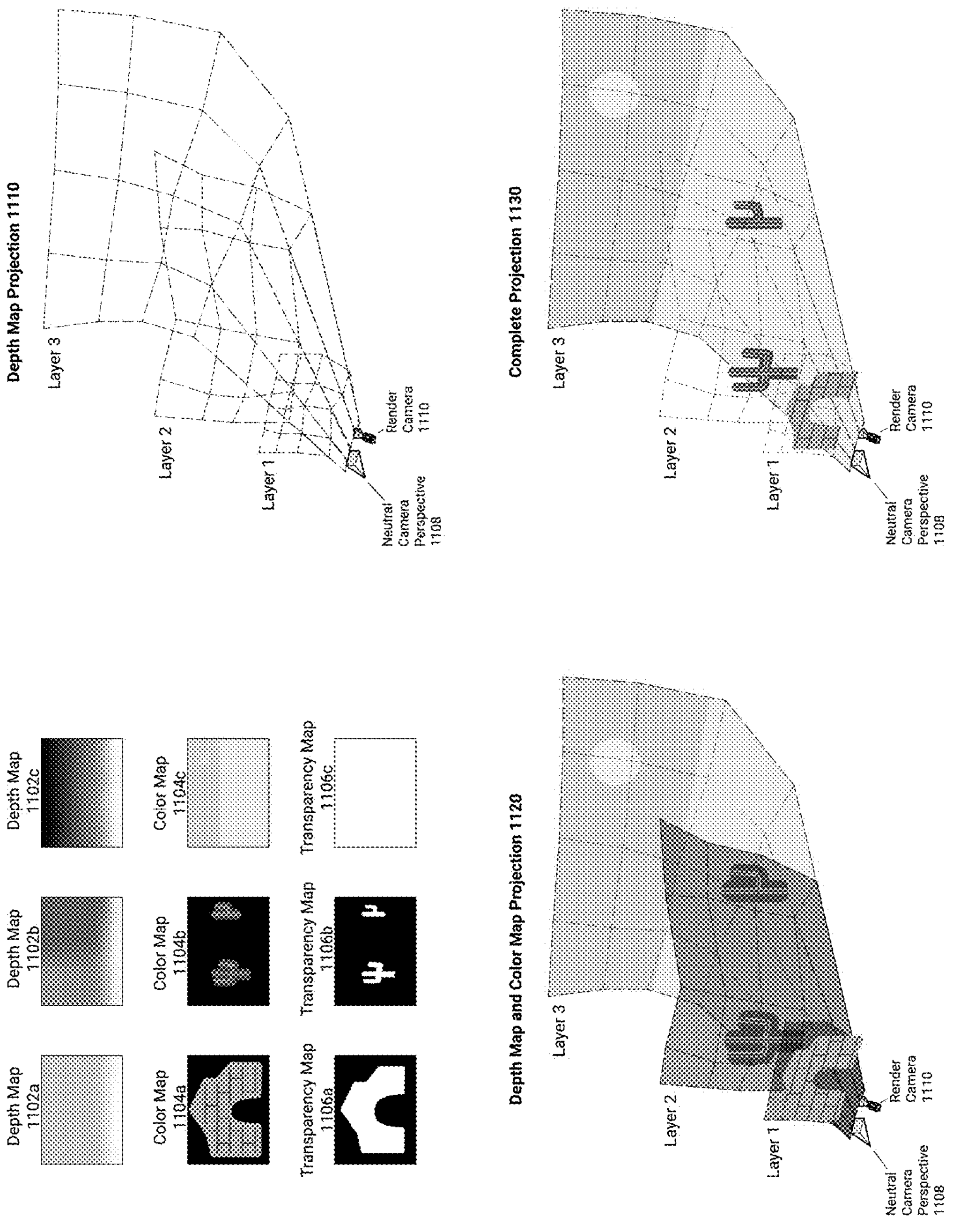
FIG. 11 shows a schematic diagram of how an MSR with three scene layers can be projected into a scene volume in accordance with some embodiments of the disclosed subject matter.

In parallel, the MSR 912 is passed to scene volume constructor 1010 which will use it to create a corresponding scene volume 1012. FIG. 11 illustrates how the components of an MSR can be used to construct such a scene volume 1012.

Finally, for each constructed scene volume 1012, and the corresponding render camera perspective 1008, the render engine 1014 will create a rendered perspective 1016 which is suitable to be sent to a 6 DoF display to be viewed by a user. In one example embodiment running on a VR headset, the constructed scene volumes are loaded into graphical memory and processed by a graphics pipeline on a graphics processor unit in order to produce the rendered perspective. For a VR headset, as is the case with most 6 DoF displays, the rendered perspective must be composed of two images, one intended to be displayed to the left eye and the other intended to be displayed to the right eye.

The process described above advantageously allows the user to view the scene volume from multiple positions and angles for an immersive viewing experience. For example, a user wearing a virtual reality headset can look around or move the position of the user's head to see a presented scene from different perspectives. Similarly, a user with a holographic display or other 3D panel display can be enabled to move in relation to the panel, resulting in a new vantage point, while having the scene render correctly for the user's new vantage point.

In order to enhance performance, this component may be implemented by the operating system in a computing system that contains a hardware decoder processor suitable to decode the video stream. In other embodiments, the MSR unpacker process 900 can be a pure software component running in an application layer, for example in cases wherein a client operating system does not have the capability required for a dedicated hardware decoder.

FIG. 11 is an illustration showing how, according to an embodiment, an MSR with three scene layers can be used to place features in a scene volume.

The depth maps in scene layers encode the distance and angular offset of features from a camera perspective. In one embodiment this is implemented as a 2D pixel array of depth values, and depth map 1102*a*, 1102*b* and 1102*c* can be represented as a grayscale image wherein darker pixels represent a distance further from the camera perspective. In another embodiment, the scene layer depth maps are stored in a vertex mesh. Other storage strategies will be known to those skilled in the art. layer 1's depth map 1102*a* represents objects which are generally closest to the camera, so the depth values are smaller and thus represented by a lighter color than the other depth maps. layer 2's depth map 1102*b* is a bit darker, and layer 3's depth map 1102*c* is the darkest of all where the sky is, and it is lighter when representing the ground lower down.

The color maps in scene layers are 2D pixel arrays with three color channels each. Layer 1's color map 1104*a* represents the stone arch in the foreground, but is otherwise black in areas which will be fully transparent when projected. layer 2's color map 1104*b* has two cacti, and layer 3's color map 1104*c* has the ground and far background.

The transparency maps in scene layers are 2D pixel arrays with a single channel, and in FIG. 11, they are represented in greyscale such that darker pixels represent more transparency. Because the stone arch in layer 1 is fully opaque, the pixels corresponding to its location in layer 1 are fully white, while the rest are black. The layer 2 cactus is similar, but if you were to zoom in there would be grey pixels on the edge of the cactus where the spines and organic features are not entirely opaque. In this embodiment, the features in the farthest scene layer are assumed to be opaque, which is demonstrated by the layer 3 transparency map 1106*c* being rendered as white.

The depth map projection 1110 is a rendition of how the depth maps of an MSR would look if projected into a scene volume. The neutral camera perspective 1108 is projection of the camera perspective into a 3D rendering context. The depth map and color map projection 1120 demonstrates how the color maps are added in. The complete projection 1130 has the color, depth and transparency maps all projected into a 3D rendering context such that the render camera 1110 can now generate images suitable to show to a human observer. The position, rotation and field of view of the render camera 1110 can be dynamic, responding to a viewer's head position in a VR headset or some other form of camera controls.

FIG. 12 is an illustration of the identification and sorting features in a scene volume from a camera perspective, which is an important set of steps conducted by the layer condenser in many embodiments. Scene volume 1204 contains data describing the features of three spheres, sphere A 1250, sphere B 1252 and sphere C 1254. A scene volume always has three dimensions and this diagram is drawn as viewed along the Z axis, and so the page displays the X and Y axis emanating from the volume origin 1202. The camera perspective 1208 is described by position coordinates describing its offset from the volume origin, as well as rotation coordinates indicating its orientation. It further has a field of view parameter 1210 which describes the sweep of its view into the scene volume. In this embodiment the camera perspective has a simple conical field of view.

The camera perspective origin 1206 is important for determining depth, occlusion and observability of features. The depth of a feature inside of a camera perspective is the distance of the feature from the camera perspective origin. The occlusion of a feature is determined by checking if the line between the feature and the camera perspective origin at least partially allows light through. The observability of a feature is a special property only relevant in scene volumes in which polygonal representations are used. In such scene volumes a feature is only observable if its polygon face partially points at the camera perspective origin.

The specific way in which a layer condenser identifies features can vary by embodiment and further by the underlying data structure of the scene volume being queried. Consider an example wherein scene volume 1204 is represented by polygons. In this example, a layer condenser implementation can query for all observable features, even those occluded, which fall inside of the camera perspective. In this case, the features on half of the sphere A and sphere B (those nearest the camera origin point) would be identified. Next, they can be converted into rendered features, and those rendered features can then be sorted by depth, such that the rendered features of sphere A can go on the first scene layer, and the rendered features of sphere B can be sorted to the next scene layer.

Consider an example wherein scene volume 1204 is represented by voxels. In this example a layer condenser implementation could first create a set of camera perspectives inside of a camera perspective range, and for each camera perspective in the set, query the scene volume for non-occluded features. Some of the camera perspectives considered would see around sphere A to have a non-occluded view of features on sphere B. Thus, in total, features from most of sphere A and some of sphere B would be identified. The identified features would then be converted to rendered features from the default camera perspective and sorted in scene layers by depth.

FIG. 13 is a block flow diagram illustrating a process of capturing a 3D video from a real-world location and encoding and transmitting it to a client for decoding and display on a 6 DoF headset. Video camera 1302 is used to record a video moving through a location, and it outputs raw video 1304 to a 4D scene volume construction process (1306). The process performed in 1306 will vary based on the capture device used, but in one configuration a "structure from motion" algorithm is used to turn the video data into a 4D scene volume. Next the 4D scene volume is passed to a packed MSR video construction process 600 which converts it into a packed MSR video. See FIG. 6 for more details on 600. The packed MSR video 1310 is then stored on a file server so that a client 1320 can stream the file over a network for decoding and playback via MSR decoding process 800. The output of 800 is a sequence of rendered perspectives which can then be output to the display. In one configuration 1320 is the integrated processors of a VR headset and 1322 is the integrated display of the VR headset, but many other configurations are possible. It is advantageous to stream files over a network because a user can start viewing content quickly and furthermore the 6 DoF headsets available on the market today do not have much available file storage.

Further Optional Features:

A packed MSR video can benefit from being compressed by a h265 encoder and packaged in a MPEG4 container, however, other codecs and containers formats may also be used. Both the creation of an MSR from a scene volume, as well as construction of a scene volume from an MSR, benefit from being implemented in a 3D engine such as Unity3D™, although it need not be, and other tools known in the art may be used.

In one aspect, described systems and methods may be used for AR or VR headsets and worn by users exercising on cardio machines so that the users can explore 3D landscapes while they exercise. Alternatively, systems and methods can be used with holographic displays positioned in front of the user as the user as they exercise. In other embodiments, no exercise machine is involved, and even without exercise equipment being involved in any way, MSRs described herein a superior way to transmit and display many kinds of 3D video currently being sent in other formats to 6 DoF displays.

In the cardio machine case, wherein a user observes the MSRs via a series of Smooth Camera Perspective that move forward over time, if the system presents each MSR for a shorter period of time, it can appear as if the camera were moving faster through the scene. Similarly, showing each MSR for a longer time creates an appearance of moving slower through the scene. This means that the system can present the view of the scene at a rate according to user preference, or in the exercise case, at a rate corresponding to the user's exercise pace. Further advantageously, instead of simply producing rendered video simulating teleportation of the viewing camera to discrete pose locations, alternatively the camera logic component can smoothly interpolate the camera position between these positions at any frequency that the client display hardware can handle. In this manner, the client can have an arbitrarily high rendering frame rate, even if the presenting rate of each MSR is relatively slow.

Consider a user on a treadmill who is walking slowly while watching a forward motion 3D video captured at running speed. The client system can keep each MSR on the screen longer while still moving the virtual camera slightly forward and rendering novel viewpoints with a 120 hertz (Hz) update loop.

Embodiments are also particularly advantageous in bandwidth-constrained circumstances, wherein it may not be feasible to send a full-resolution video at 60 frames per second (fps). Existing video streaming systems may appear very different when the frame rate changes and, thus, attempt to keep the frame rate fixed while reducing the resolution and bitrate. In contrast, when embodiment systems render a mostly static scene from a moving camera (which is often the case for forward motion footage filmed outside), the effective frame rate can be kept high by updating the virtual camera even if the rendered scene volume is updating at a much slower rate. Thus, when bandwidth is constrained, the client can optionally switch to a stream with fewer frames per second instead of a stream with fewer bits per frame.

Certain Advantages of Embodiments

Embodiments that include packing the MSR data into a frame for transmission over a standard video stream result in video compression that is much improved over existing approaches, such as stereo packed video.

Further, quite low frame rates can be encoded into the packed MSR video, even frame rates as low as 1 frame per second, and these low frame rates can still provide a good playback experience for a playback client when interpolation of the virtual camera is used. This means that streaming options for low-bandwidth conditions are much more appealing than for existing compression formats, methods, and systems.

Renderings can be exceedingly realistic using embodiments, even when the resolution of the opacity layer is low and/or the opacity of each pixel is encoded with a low bit depth. Those of skill in the art would have generally understood that precise opacity specification would matter a lot. However, it has been discovered that for embodiment methods, when rendering organic shapes like those found in the real world, opacity blending need not be particularly precise, and renderings can still remain very good.

Furthermore, embodiments include the advantage that better machine learning in the reconstruction steps, by using semantic scene understanding, can result in more accurate estimations of scene depth.

DEFINITIONS

A "multilayer scene representation" (MSR) is a plurality of scene layers describing a scene volume. An MSR may optionally describe the camera perspective used by each or all scene layers.

A "depth map" is a mapping of depth values to angular offset. One can be used in conjunction with a camera perspective to place features into a scene volume.

A "color map" is a mapping of color values to angular offset. One can be used in conjunction with a camera perspective to set color values of features placed in a scene volume.

A "transparency map" is a mapping of transparency values to angular offset. One can be used in conjunction with a camera perspective to set transparency values of features placed in a scene volume.

A "scene layer" is the combination of a depth map, color map and optionally transparency map. Together these can be used in conjunction with a camera perspective to place features in a scene volume and set color and transparency values for them.

A "packed MSR" is data describing an MSR which has been compressed to be described in fewer total bits than the input MSR. A packed MSR may exist as a continuous data structure or it may instead be split across two or more data structures. An example of being split across data structures includes the case where the transparency and color maps from an MSR are packed and compressed into four channel color image format and the depth maps are encoded into a vertex mesh data format.

A "packed MSR video" is data containing a time ordered series of compressed MSR data structures. One example is a MP4 video where each frame represents a compressed MSR. Another example is a pair of data structures, the first being a time indexed sequence of 3D mesh data, where each 3D mesh encodes a depth map, and the second being a MP4 video where each frame encodes color and transparency maps. A second example is a MP4 video where each frame contains the data from an MSR packed into an image.

A "camera perspective" represents a 3D angular field of view of a scene volume. A camera perspective can be specified by the position, rotation and lens geometry. The simplest example would be a cone of a certain field of view, but other less regular shapes are possible.

A "camera perspective range" is a specification for a range of three position and three rotation values with respect to a default camera perspective. A simple example specification would be "all positions within 1 meter of the default camera perspective, at all possible rotation values." A second and more complicated example might specify all positions 100 cm above, below, left and right of a default camera perspective, but no positions in front of it or behind it, and furthermore only camera rotations resulting in a forward axis within 45 degrees of the default camera position forward axis.

A "scene volume" is a data structure describing features in three dimensions (3D). The utility of a scene volume derives from an ability to query features from multiple possible camera perspectives. A scene volume can be constructed in many ways. For example, a scene volume describing the inside of a house can be created by recording an existing home with a camera and processing the camera data into textures and surfaces. Alternatively, a scene volume of a house can be created by an artist using a CAD program. A scene volume can be created synthetically and can, thus, be a synthetic scene volume, as will be understood by those of ordinary skill in the arts of computer-generated graphics and animation in reference to this disclosure. Another example of a scene volume is a trained machine learning model which has been configured to take a camera perspective as input and produce visual features as output. A scene volume has no internal concept of time, and so can be assumed to represent spatial information at a single time slice.

A "4D scene volume" is a data structure describing scene volumes at multiple time values within a range. A simple example would be a collection of scene volumes indexed by discrete timestamp. Another example is a computer-generated animation where components are programmed to change appearance as a function of time.

A "rendered perspective" is data sufficient to fill a display with visual information from a virtual camera inside of a scene volume.

A "display" is a television, computer monitor, virtual reality headset, augmented reality headset, or other physical technology used to present visual data to a user.

A "feature" is a region of a scene volume which influences the light which will reach virtual cameras within the scene volume. In a scene volume configured to represent the light physics of the actual world, the influence may be due to emission, occlusion, reflection, or a combination.

A "rendered feature" is the location, color and transparency values of a scene volume feature as observed within a camera perspective.

The "depth" of a rendered feature is defined as the distance between the rendered feature's location in a scene volume and the origin of the camera perspective from which the rendered feature was observed.

While example embodiments have been particularly shown and described, it will be understood by those skilled in the art that various changes in form and details may be made therein without departing from the scope of the embodiments encompassed by the appended claims.

What is claimed is:

1. A computer-implemented method for outputting a sequence of packed multilayer scene representations (MSRs), the method comprising:

a.) identifying a given scene volume of a plurality of scene volumes by querying a 4D scene volume with a time value associated with a corresponding camera perspective of a sequence of camera perspectives;

b.) identifying rendered features of the given scene volume that are visible within a camera perspective range around the corresponding camera perspective;

c.) sorting by depth the rendered features into a plurality of scene layers wherein each respective scene layer of the plurality of scene layers includes, for respective rendered features that are sorted into the respective scene layer: (i) a corresponding depth map for the respective rendered features, the depth map based on depth information from the scene volume, (ii) a corresponding color map for the respective rendered features, and (iii) a corresponding transparency map for the respective rendered features;

d.) packing the plurality of scene layers and the camera perspective to produce a packed MSR; and e.) repeating steps a.), b.), c.), and d.) for scene volumes of the plurality of scene volumes and corresponding camera perspectives of the sequence of camera perspectives, to produce and output a sequence of packed MSRs.

2. The method of claim 1, further comprising constructing at least one 4D scene volume using sequential color images captured by a camera.

3. The method of claim 1, further comprising calculating the color of rendered features of at least one scene volume using aggregated observations from each camera perspective inside of the camera perspective range.

4. The method of claim 1, further comprising duplicating rendered features of a scene layer into an adjacent scene layer along transition boundaries in order to reduce the chance of visible seams during playback.

5. The method of claim 1, further comprising creating occluded features in at least one scene volume using a machine learning model.

6. The method of claim 1, further comprising selecting the camera perspective range by anticipating the viewing range of a 6DoF video playback.

7. The method of claim 1, further comprising sorting the rendered features of each scene volume into a fixed number of scene layers, the fixed number of scene layers being at least two scene layers.

8. The method of claim 7, further comprising packing and sequencing the sequence of packed MSRs into a packed MSR video.

9. The method of claim 8, wherein the packed MSR combines the transparency map of each non-background scene layer into a single 2D color array using a transform function which places the transparency map of each layer into a subset of a color gamut represented by each pixel.

10. The method of claim 8, further comprising reducing the size of the depth map before producing and outputting the packed MSR.

11. A method for decoding a packed MSR video, the packed MSR video including a sequence of packed MSRs, the method comprising:

a) decoding the sequence of packed MSRs, the decoding including:

a.) extracting a packed MSR from the packed MSR video;

b.) extracting a plurality of scene layers from the packed MSR;

c.) determining a camera perspective from the packed MSR;

d) assigning depth to respective features of a scene volume based on respective depth maps of respective scene layers and the camera perspective;

e) assigning color to the respective features of a scene volume based on respective color maps of the respective scene layers;

f) assigning transparency to the respective features of a scene volume based on respective transparency maps of the respective scene layers; and g) repeating steps a), b), c), d), e), and f) for each packed MSR of the sequence of packed MSRs.

12. The method of claim 11, further comprising determining a render camera perspective based, at least in part, on a time weighted average of a user head pose.

13. A system for outputting a sequence of packed multilayer scene representations (MSRs), the system comprising: one or more processors configured to:

a.) identify a given scene volume of a plurality of scene volumes by querying a 4D scene volume with a time value associated with a corresponding camera perspective of a sequence of camera perspectives;

b.) identify rendered features of the given scene volume that are visible within a camera perspective range around the corresponding camera perspective;

c.) sort by depth the rendered features into a plurality of scene layers wherein each respective scene layer of the plurality of scene layers includes, for respective rendered features that are sorted into the respective scene layer: (i) a corresponding depth map for the respective rendered features, the depth map based on depth information from the scene volume, (ii) a corresponding color map for the respective rendered features, and (iii) a corresponding transparency map for the respective rendered features;

d.) pack the plurality of scene layers and the camera perspective to produce a packed MSR; and e.) repeat steps a.), b.), c.), and d.) for scene volumes of the plurality of scene volumes and corresponding camera perspectives of the sequence of camera perspectives, to produce and output a sequence of packed MSRs.

14. One or more non-transitory, computer-readable media comprising instructions that, when executed by one or more processors, cause a device to:

a.) identify a given scene volume of a plurality of scene volumes by querying a 4D scene volume with a time value associated with a corresponding camera perspective of a sequence of camera perspectives;

b.) identify rendered features of the given scene volume that are visible within a camera perspective range around the corresponding camera perspective;

c.) sort by depth the rendered features into a plurality of scene layers wherein each respective scene layer of the plurality of scene layers includes, for respective rendered features that are sorted into the respective scene layer: (i) a corresponding depth map for the respective rendered features, the depth map based on depth information from the scene volume, (ii) a corresponding color map for the respective rendered features, and (iii) a corresponding transparency map for the respective rendered features;

d.) pack the plurality of scene layers and the camera perspective to produce a packed multilayer scene representation (MSR); and e.) repeat steps a.), b.), c.), and d.) for scene volumes of the plurality of scene volumes and corresponding camera perspectives of the sequence of camera perspectives, to produce and output a sequence of packed MSRs.

15. A system for decoding a packed MSR video, the packed MSR video including a sequence of packed MSRs, the system comprising:

one or more processors configured to:

a.) extract a packed MSR from a packed MSR video;

b.) extract a plurality of scene layers from the packed MSR;

c.) determine a camera perspective from the packed MSR;

d) assign depth to respective features of a scene volume based on respective depth maps of respective scene layers and the camera perspective;

e) assign color to the respective features of a scene volume based on respective color maps of the respective scene layers;

f) assign transparency to the respective features of a scene volume based on respective transparency maps of the respective scene layers; and g) repeat steps a), b), c), d), e), and f) for each packed MSR of the sequence of packed MSRs.

16. One or more non-transitory, computer-readable media comprising instructions for decoding a sequence of packed MSRs that, when executed by one or more processors, cause a device to:

a.) extract a packed MSR from a packed MSR video;

b.) extract a plurality of scene layers from the packed MSR;

c.) determine a camera perspective from the packed MSR;

d) assign depth to respective features of a scene volume based on respective depth maps of respective scene layers and the camera perspective;

e) assign color to the respective features of a scene volume based on respective color maps of the respective scene layers;

f) assign transparency to the respective features of a scene volume based on respective transparency maps of the respective scene layers; and g) repeat steps a), b), c), d), e), and f) for each packed MSR of the sequence of packed MSRs.

* * * * *